(12) United States Patent
Vorbach et al.

(10) Patent No.: US 8,281,108 B2
(45) Date of Patent: Oct. 2, 2012

(54) RECONFIGURABLE GENERAL PURPOSE PROCESSOR HAVING TIME RESTRICTED CONFIGURATIONS

(76) Inventors: Martin Vorbach, Munich (DE); Volker Baumgarte, Munich (DE)

( * ) Notice: Subject to any disclaimer, the term of this patent is extended or adjusted under 35 U.S.C. 154(b) by 0 days.

(21) Appl. No.: 10/501,845

(22) PCT Filed: Jan. 20, 2003

(86) PCT No.: PCT/DE03/00152
§ 371 (c)(1),
(2), (4) Date: Aug. 26, 2005

(87) PCT Pub. No.: WO03/060747
PCT Pub. Date: Jul. 24, 2003

(65) Prior Publication Data
US 2006/0090062 A1   Apr. 27, 2006

(30) Foreign Application Priority Data
Jan. 19, 2002  (DE) .................................. 102 02 044
Jan. 20, 2002  (DE) .................................. 102 02 175

(51) Int. Cl.
*G06F 15/16*   (2006.01)
(52) U.S. Cl. ........................................................ 712/15
(58) Field of Classification Search .................. 712/15, 712/34, 55; 714/55
See application file for complete search history.

(56) References Cited

U.S. PATENT DOCUMENTS

| | | | |
|---|---|---|---|
| 2,067,477 A | 1/1937 | Cooper | |
| 3,242,998 A | 3/1966 | Gubbins | |
| 3,564,506 A | 2/1971 | Bee et al. | |
| 3,681,578 A | 8/1972 | Stevens | |
| 3,753,008 A | 8/1973 | Guarnaschelli | |
| 3,754,211 A | 8/1973 | Rocher et al. | |
| 3,757,608 A | 9/1973 | Willner | |
| 3,855,577 A | 12/1974 | Vandierendonck | |
| 3,956,589 A | 5/1976 | Weathers et al. | |
| 4,041,462 A * | 8/1977 | Davis et al. ................. | 712/228 |
| 4,151,611 A | 4/1979 | Sugawara et al. | |
| 4,233,667 A | 11/1980 | Devine et al. | |
| 4,414,547 A | 11/1983 | Knapp et al. | |
| 4,498,134 A | 2/1985 | Hansen et al. | |
| 4,498,172 A | 2/1985 | Bhavsar | |
| 4,566,102 A | 1/1986 | Hefner | |
| 4,571,736 A | 2/1986 | Agrawal et al. | |
| 4,590,583 A | 5/1986 | Miller | |

(Continued)

FOREIGN PATENT DOCUMENTS

DE   42 21 278   1/1994

(Continued)

OTHER PUBLICATIONS

Bondalapati et al. (Bondalapati) (Reconfigurable Meshes: Theory and Practice); Reconfigurable Architectures Workshop, International Parallel Processing Symposium, Apr. 1999; 15 pages; best available copy (Figures do not show up, but are unrelied upon in the office action).*

(Continued)

*Primary Examiner* — Keith Vicary
(74) *Attorney, Agent, or Firm* — Kenyon & Kenyon LLP

(57) ABSTRACT

A processor includes a reconfigurable field of data processing cells. A register is provided where the register has a data stream memory designed to store a data stream and/or parts thereof. The register may be a RAM PAE.

5 Claims, 8 Drawing Sheets

U.S. PATENT DOCUMENTS

| | | | |
|---|---|---|---|
| 4,591,979 A | 5/1986 | Iwashita | |
| 4,594,682 A | 6/1986 | Drimak | |
| 4,646,300 A | 2/1987 | Goodman et al. | |
| 4,663,706 A | 5/1987 | Allen et al. | |
| 4,667,190 A | 5/1987 | Fant et al. | |
| 4,682,284 A | 7/1987 | Schrofer | |
| 4,686,386 A | 8/1987 | Tadao | |
| 4,706,216 A | 11/1987 | Carter | |
| 4,720,780 A | 1/1988 | Dolecek | |
| 4,739,474 A | 4/1988 | Holsztynski | |
| 4,760,525 A | 7/1988 | Webb | |
| 4,761,755 A | 8/1988 | Ardini et al. | |
| 4,791,603 A | 12/1988 | Henry | |
| 4,811,214 A | 3/1989 | Nosenchuck et al. | |
| 4,852,043 A | 7/1989 | Guest | |
| 4,852,048 A | 7/1989 | Morton | |
| 4,860,201 A | 8/1989 | Miranker et al. | |
| 4,870,302 A | 9/1989 | Freeman | |
| 4,873,666 A | 10/1989 | Lefebvre et al. | |
| 4,882,687 A | 11/1989 | Gordon | |
| 4,884,231 A | 11/1989 | Mor et al. | |
| 4,891,810 A | 1/1990 | de Corlieu et al. | |
| 4,901,268 A | 2/1990 | Judd | |
| 4,910,665 A | 3/1990 | Mattheyses et al. | |
| 4,918,440 A | 4/1990 | Furtek et al. | |
| 4,939,641 A | 7/1990 | Schwartz et al. | |
| 4,959,781 A | 9/1990 | Rubinstein et al. | |
| 4,967,340 A | 10/1990 | Dawes | |
| 4,972,314 A | 11/1990 | Getzinger et al. | |
| 4,992,933 A | 2/1991 | Taylor | |
| 5,010,401 A | 4/1991 | Murakami et al. | |
| 5,014,193 A | 5/1991 | Garner et al. | |
| 5,015,884 A | 5/1991 | Agrawal et al. | |
| 5,021,947 A | 6/1991 | Campbell et al. | |
| 5,023,775 A | 6/1991 | Poret | |
| 5,031,179 A | 7/1991 | Yoshida et al. | |
| 5,034,914 A | 7/1991 | Osterlund | |
| 5,036,473 A | 7/1991 | Butts et al. | |
| 5,036,493 A | 7/1991 | Nielsen | |
| 5,041,924 A | 8/1991 | Blackborow et al. | |
| 5,043,978 A | 8/1991 | Nagler et al. | |
| 5,047,924 A | 9/1991 | Matsubara et al. | |
| 5,055,997 A | 10/1991 | Sluijter et al. | |
| 5,065,308 A | 11/1991 | Evans | |
| 5,072,178 A | 12/1991 | Matsumoto | |
| 5,081,375 A | 1/1992 | Pickett et al. | |
| 5,099,447 A | 3/1992 | Myszewski | |
| 5,103,311 A | 4/1992 | Sluijter et al. | |
| 5,109,503 A | 4/1992 | Cruickshank et al. | |
| 5,113,498 A | 5/1992 | Evan et al. | |
| 5,115,510 A | 5/1992 | Okamoto et al. | |
| 5,119,290 A | 6/1992 | Loo et al. | |
| 5,123,109 A | 6/1992 | Hillis | |
| 5,125,801 A | 6/1992 | Nabity et al. | |
| 5,128,559 A | 7/1992 | Steele | |
| 5,142,469 A | 8/1992 | Weisenborn | |
| 5,144,166 A | 9/1992 | Camarota et al. | |
| 5,193,202 A | 3/1993 | Lee et al. | |
| 5,203,005 A | 4/1993 | Horst | |
| 5,204,935 A | 4/1993 | Mihara et al. | |
| 5,208,491 A | 5/1993 | Ebeling et al. | |
| 5,212,716 A | 5/1993 | Ferraiolo et al. | |
| 5,212,777 A | 5/1993 | Gove et al. | |
| 5,218,302 A | 6/1993 | Loewe et al. | |
| 5,226,122 A | 7/1993 | Thayer et al. | |
| RE34,363 E | 8/1993 | Freeman | |
| 5,233,539 A | 8/1993 | Agrawal et al. | |
| 5,237,686 A | 8/1993 | Asano et al. | |
| 5,243,238 A | 9/1993 | Kean | |
| 5,245,616 A | 9/1993 | Olson | |
| 5,247,689 A | 9/1993 | Ewert | |
| RE34,444 E | 11/1993 | Kaplinsky | |
| 5,274,593 A | 12/1993 | Proebsting | |
| 5,276,836 A | 1/1994 | Fukumaru et al. | |
| 5,287,472 A | 2/1994 | Horst | |
| 5,287,511 A | 2/1994 | Robinson et al. | |
| 5,287,532 A | 2/1994 | Hunt | |
| 5,294,119 A | 3/1994 | Vincent et al. | |
| 5,301,284 A | 4/1994 | Estes et al. | |
| 5,301,344 A | 4/1994 | Kolchinsky | |
| 5,303,172 A | 4/1994 | Magar et al. | |
| 5,311,079 A | 5/1994 | Ditlow et al. | |
| 5,327,125 A | 7/1994 | Iwase et al. | |
| 5,336,950 A | 8/1994 | Popli et al. | |
| 5,343,406 A | 8/1994 | Freeman et al. | |
| 5,347,639 A | 9/1994 | Rechtschaffen et al. | |
| 5,349,193 A | 9/1994 | Mott et al. | |
| 5,353,432 A | 10/1994 | Richek et al. | |
| 5,355,508 A | 10/1994 | Kan | |
| 5,361,373 A | 11/1994 | Gilson | |
| 5,365,125 A | 11/1994 | Goetting et al. | |
| 5,379,444 A | 1/1995 | Mumme | |
| 5,386,154 A | 1/1995 | Goetting et al. | |
| 5,386,518 A | 1/1995 | Reagle et al. | |
| 5,392,437 A | 2/1995 | Matter et al. | |
| 5,408,643 A | 4/1995 | Katayose | |
| 5,410,723 A | 4/1995 | Schmidt et al. | |
| 5,412,795 A | 5/1995 | Larson | |
| 5,418,952 A | 5/1995 | Morley et al. | |
| 5,418,953 A | 5/1995 | Hunt et al. | |
| 5,421,019 A | 5/1995 | Holsztynski et al. | |
| 5,422,823 A | 6/1995 | Agrawal et al. | |
| 5,425,036 A | 6/1995 | Liu et al. | |
| 5,426,378 A | 6/1995 | Ong | |
| 5,428,526 A | 6/1995 | Flood et al. | |
| 5,430,687 A | 7/1995 | Hung et al. | |
| 5,435,000 A | 7/1995 | Boothroyd et al. | |
| 5,440,245 A | 8/1995 | Galbraith et al. | |
| 5,440,538 A | 8/1995 | Olsen | |
| 5,442,790 A | 8/1995 | Nosenchuck | |
| 5,444,394 A | 8/1995 | Watson et al. | |
| 5,448,186 A | 9/1995 | Kawata | |
| 5,450,022 A | 9/1995 | New | |
| 5,455,525 A | 10/1995 | Ho et al. | |
| 5,457,644 A | 10/1995 | McCollum | |
| 5,465,375 A | 11/1995 | Thepaut et al. | |
| 5,469,003 A | 11/1995 | Kean | |
| 5,473,266 A | 12/1995 | Ahanin et al. | |
| 5,473,267 A | 12/1995 | Stansfield | |
| 5,475,583 A | 12/1995 | Bock et al. | |
| 5,475,803 A | 12/1995 | Stearns et al. | |
| 5,475,856 A | 12/1995 | Kogge | |
| 5,477,525 A | 12/1995 | Okabe | |
| 5,483,620 A | 1/1996 | Pechanek et al. | |
| 5,485,103 A | 1/1996 | Pedersen et al. | |
| 5,485,104 A | 1/1996 | Agrawal et al. | |
| 5,489,857 A | 2/1996 | Agrawal et al. | |
| 5,491,353 A | 2/1996 | Kean | |
| 5,493,239 A | 2/1996 | Zlotnick | |
| 5,493,663 A | 2/1996 | Parikh | |
| 5,497,498 A | 3/1996 | Taylor | |
| 5,502,838 A | 3/1996 | Kikinis | |
| 5,504,439 A | 4/1996 | Tavana | |
| 5,506,998 A | 4/1996 | Kato et al. | |
| 5,510,730 A | 4/1996 | El Gamal et al. | |
| 5,511,173 A | 4/1996 | Yamaura et al. | |
| 5,513,366 A | 4/1996 | Agarwal et al. | |
| 5,521,837 A | 5/1996 | Frankle et al. | |
| 5,522,083 A | 5/1996 | Gove et al. | |
| 5,525,971 A | 6/1996 | Flynn | |
| 5,530,873 A | 6/1996 | Takano | |
| 5,530,946 A | 6/1996 | Bouvier et al. | |
| 5,532,693 A | 7/1996 | Winters et al. | |
| 5,532,957 A | 7/1996 | Malhi | |
| 5,535,406 A | 7/1996 | Kolchinsky | |
| 5,537,057 A | 7/1996 | Leong et al. | |
| 5,537,580 A | 7/1996 | Giomi et al. | |
| 5,537,601 A | 7/1996 | Kimura et al. | |
| 5,541,530 A | 7/1996 | Cliff et al. | |
| 5,544,336 A | 8/1996 | Kato et al. | |
| 5,548,773 A | 8/1996 | Kemeny et al. | |
| 5,550,782 A | 8/1996 | Cliff et al. | |
| 5,555,434 A | 9/1996 | Carlstedt | |
| 5,559,450 A | 9/1996 | Ngai et al. | |
| 5,561,738 A | 10/1996 | Kinerk et al. | |
| 5,568,624 A | 10/1996 | Sites et al. | |
| 5,570,040 A | 10/1996 | Lytle et al. | |

| | | | | | |
|---|---|---|---|---|---|
| 5,574,927 A | 11/1996 | Scantlin | 5,781,756 A | 7/1998 | Hung |
| 5,574,930 A | 11/1996 | Halverson, Jr. et al. | 5,784,313 A | 7/1998 | Trimberger et al. |
| 5,581,731 A | 12/1996 | King et al. | 5,784,630 A | 7/1998 | Saito et al. |
| 5,581,734 A | 12/1996 | DiBrino et al. | 5,784,636 A | 7/1998 | Rupp |
| 5,583,450 A | 12/1996 | Trimberger et al. | 5,794,059 A | 8/1998 | Barker et al. |
| 5,584,013 A | 12/1996 | Cheong et al. | 5,794,062 A | 8/1998 | Baxter |
| 5,586,044 A | 12/1996 | Agrawal et al. | 5,801,547 A | 9/1998 | Kean |
| 5,587,921 A | 12/1996 | Agrawal et al. | 5,801,715 A | 9/1998 | Norman |
| 5,588,152 A | 12/1996 | Dapp et al. | 5,801,958 A | 9/1998 | Dangelo et al. |
| 5,590,345 A | 12/1996 | Barker et al. | 5,802,290 A | 9/1998 | Casselman |
| 5,590,348 A | 12/1996 | Phillips et al. | 5,815,004 A | 9/1998 | Trimberger et al. |
| 5,596,742 A | 1/1997 | Agarwal et al. | 5,815,715 A | 9/1998 | Kayhan |
| 5,600,265 A | 2/1997 | El Gamal et al. | 5,815,726 A | 9/1998 | Cliff |
| 5,600,597 A | 2/1997 | Kean et al. | 5,828,229 A | 10/1998 | Cliff et al. |
| 5,600,845 A | 2/1997 | Gilson | 5,828,858 A | 10/1998 | Athanas et al. |
| 5,602,999 A | 2/1997 | Hyatt | 5,831,448 A | 11/1998 | Kean |
| 5,603,005 A | 2/1997 | Bauman et al. | 5,832,288 A | 11/1998 | Wong |
| 5,608,342 A | 3/1997 | Trimberger | 5,834,612 A | 11/1998 | Cooke et al. |
| 5,611,049 A | 3/1997 | Pitts | 5,838,165 A | 11/1998 | Chatter |
| 5,617,547 A | 4/1997 | Feeney et al. | 5,838,988 A | 11/1998 | Panwar et al. |
| 5,617,577 A | 4/1997 | Barker et al. | 5,844,422 A | 12/1998 | Trimberger et al. |
| 5,619,720 A | 4/1997 | Garde et al. | 5,844,888 A | 12/1998 | Markkula, Jr. et al. |
| 5,625,806 A | 4/1997 | Kromer | 5,848,238 A | 12/1998 | Shimomura et al. |
| 5,625,836 A | 4/1997 | Barker et al. | 5,854,918 A | 12/1998 | Baxter |
| 5,634,131 A | 5/1997 | Matter et al. | 5,857,097 A | 1/1999 | Henzinger et al. |
| 5,635,851 A | 6/1997 | Tavana | 5,857,109 A | 1/1999 | Taylor |
| 5,642,058 A | 6/1997 | Trimberger et al. | 5,859,544 A | 1/1999 | Norman |
| 5,646,544 A | 7/1997 | Iadanza | 5,860,119 A * | 1/1999 | Dockser ........................ 711/156 |
| 5,646,545 A | 7/1997 | Trimberger et al. | 5,862,403 A | 1/1999 | Kanai et al. |
| 5,649,176 A | 7/1997 | Selvidge et al. | 5,865,239 A | 2/1999 | Carr |
| 5,649,179 A | 7/1997 | Steenstra et al. | 5,867,691 A | 2/1999 | Shiraishi |
| 5,652,529 A | 7/1997 | Gould et al. | 5,867,723 A | 2/1999 | Peters et al. |
| 5,652,894 A | 7/1997 | Hu et al. | 5,870,620 A | 2/1999 | Kadosumi et al. |
| 5,655,069 A | 8/1997 | Ogawara et al. | 5,884,075 A | 3/1999 | Hester et al. |
| 5,655,124 A | 8/1997 | Lin | 5,887,162 A | 3/1999 | Williams et al. |
| 5,656,950 A | 8/1997 | Duong et al. | 5,887,165 A | 3/1999 | Martel et al. |
| 5,657,330 A | 8/1997 | Matsumoto | 5,889,533 A | 3/1999 | Lee |
| 5,659,785 A | 8/1997 | Pechanek et al. | 5,889,982 A | 3/1999 | Rodgers et al. |
| 5,659,797 A | 8/1997 | Zandveld et al. | 5,892,370 A | 4/1999 | Eaton et al. |
| 5,675,262 A | 10/1997 | Duong et al. | 5,892,961 A | 4/1999 | Trimberger |
| 5,675,743 A | 10/1997 | Mavity | 5,892,962 A | 4/1999 | Cloutier |
| 5,675,757 A | 10/1997 | Davidson et al. | 5,894,565 A | 4/1999 | Furtek et al. |
| 5,675,777 A | 10/1997 | Glickman | 5,895,487 A | 4/1999 | Boyd et al. |
| 5,677,909 A | 10/1997 | Heide | 5,898,602 A | 4/1999 | Rothman et al. |
| 5,680,583 A | 10/1997 | Kuijsten | 5,901,279 A | 5/1999 | Davis, III |
| 5,682,491 A | 10/1997 | Pechanek et al. | 5,915,099 A | 6/1999 | Takata et al. |
| 5,682,544 A | 10/1997 | Pechanek et al. | 5,915,123 A | 6/1999 | Mirsky et al. |
| 5,687,325 A | 11/1997 | Chang | 5,924,119 A | 7/1999 | Sindhu et al. |
| 5,694,602 A | 12/1997 | Smith | 5,926,638 A | 7/1999 | Inoue |
| 5,696,976 A | 12/1997 | Nizar et al. | 5,927,423 A | 7/1999 | Wada et al. |
| 5,701,091 A | 12/1997 | Kean | 5,933,023 A | 8/1999 | Young |
| 5,705,158 A | 1/1998 | Hansen et al. | 5,933,642 A | 8/1999 | Baxter et al. |
| 5,705,938 A | 1/1998 | Kean | 5,936,424 A | 8/1999 | Young et al. |
| 5,706,482 A | 1/1998 | Matsushima et al. | 5,941,977 A * | 8/1999 | Panwar et al. ................... 712/23 |
| 5,713,037 A | 1/1998 | Wilkinson et al. | 5,943,242 A | 8/1999 | Vorbach et al. |
| 5,717,890 A | 2/1998 | Ichida et al. | 5,956,518 A | 9/1999 | DeHon et al. |
| 5,717,943 A | 2/1998 | Barker et al. | 5,960,193 A | 9/1999 | Guttag et al. |
| 5,727,229 A | 3/1998 | Kan et al. | 5,960,200 A | 9/1999 | Eager et al. |
| 5,732,209 A | 3/1998 | Vigil et al. | 5,966,143 A | 10/1999 | Breternitz, Jr. |
| 5,734,869 A | 3/1998 | Chen | 5,966,534 A | 10/1999 | Cooke et al. |
| 5,734,921 A | 3/1998 | Dapp et al. | 5,970,254 A | 10/1999 | Cooke et al. |
| 5,737,516 A | 4/1998 | Circello et al. | 5,978,260 A | 11/1999 | Trimberger et al. |
| 5,737,565 A | 4/1998 | Mayfield | 5,978,583 A | 11/1999 | Ekanadham et al. |
| 5,742,180 A | 4/1998 | Detton et al. | 5,996,048 A | 11/1999 | Cherabuddi et al. |
| 5,745,734 A | 4/1998 | Craft et al. | 5,996,083 A | 11/1999 | Gupta et al. |
| 5,748,872 A | 5/1998 | Norman | 5,999,990 A | 12/1999 | Sharrit et al. |
| 5,748,979 A | 5/1998 | Trimberger | 6,003,143 A | 12/1999 | Kim et al. |
| 5,752,035 A | 5/1998 | Trimberger | 6,011,407 A | 1/2000 | New |
| 5,754,459 A | 5/1998 | Telikepalli | 6,014,509 A | 1/2000 | Furtek et al. |
| 5,754,820 A | 5/1998 | Yamagami | 6,020,758 A | 2/2000 | Patel et al. |
| 5,754,827 A | 5/1998 | Barbier et al. | 6,020,760 A | 2/2000 | Sample et al. |
| 5,754,871 A | 5/1998 | Wilkinson et al. | 6,021,490 A | 2/2000 | Vorbach et al. |
| 5,754,876 A | 5/1998 | Tamaki et al. | 6,023,564 A | 2/2000 | Trimberger |
| 5,760,602 A | 6/1998 | Tan | 6,023,742 A | 2/2000 | Ebeling et al. |
| 5,761,484 A | 6/1998 | Agarwal et al. | 6,026,478 A | 2/2000 | Dowling |
| 5,768,629 A | 6/1998 | Wise et al. | 6,026,481 A | 2/2000 | New et al. |
| 5,773,994 A | 6/1998 | Jones | 6,034,538 A | 3/2000 | Abramovici |
| 5,778,237 A | 7/1998 | Yamamoto et al. | 6,035,371 A | 3/2000 | Magloire |
| 5,778,439 A | 7/1998 | Timberger et al. | 6,038,650 A | 3/2000 | Vorbach et al. |

| | | | |
|---|---|---|---|
| 6,038,656 A | 3/2000 | Cummings et al. | |
| 6,044,030 A | 3/2000 | Zheng et al. | |
| 6,045,585 A | 4/2000 | Blainey | |
| 6,047,115 A | 4/2000 | Mohan et al. | |
| 6,049,222 A | 4/2000 | Lawman | |
| 6,052,524 A | 4/2000 | Pauna | |
| 6,052,773 A | 4/2000 | DeHon et al. | |
| 6,054,873 A | 4/2000 | Laramie | |
| 6,055,619 A | 4/2000 | North et al. | |
| 6,058,266 A | 5/2000 | Megiddo et al. | |
| 6,058,469 A | 5/2000 | Baxter | |
| 6,064,819 A | 5/2000 | Franssen et al. | |
| 6,072,348 A | 6/2000 | New et al. | |
| 6,076,157 A * | 6/2000 | Borkenhagen et al. | 712/228 |
| 6,077,315 A | 6/2000 | Greenbaum et al. | |
| 6,078,736 A | 6/2000 | Guccione | |
| 6,081,903 A | 6/2000 | Vorbach et al. | |
| 6,084,429 A | 7/2000 | Trimberger | |
| 6,085,317 A | 7/2000 | Smith | |
| 6,086,628 A | 7/2000 | Dave et al. | |
| 6,088,795 A | 7/2000 | Vorbach et al. | |
| 6,092,174 A | 7/2000 | Roussakov | |
| RE36,839 E | 8/2000 | Simmons et al. | |
| 6,096,091 A | 8/2000 | Hartmann | |
| 6,105,105 A | 8/2000 | Trimberger et al. | |
| 6,105,106 A | 8/2000 | Manning | |
| 6,108,760 A | 8/2000 | Mirsky et al. | |
| 6,118,724 A | 9/2000 | Higginbottom | |
| 6,119,181 A | 9/2000 | Vorbach et al. | |
| 6,122,719 A | 9/2000 | Mirsky et al. | |
| 6,125,072 A | 9/2000 | Wu | |
| 6,125,408 A | 9/2000 | McGee et al. | |
| 6,127,908 A | 10/2000 | Bozler et al. | |
| 6,128,720 A | 10/2000 | Pechanek et al. | |
| 6,134,166 A | 10/2000 | Lytle et al. | |
| 6,137,307 A | 10/2000 | Iwanczuk et al. | |
| 6,145,072 A | 11/2000 | Shams et al. | |
| 6,150,837 A | 11/2000 | Beal et al. | |
| 6,150,839 A | 11/2000 | New et al. | |
| 6,154,048 A | 11/2000 | Iwanczuk et al. | |
| 6,154,049 A | 11/2000 | New | |
| 6,154,826 A | 11/2000 | Wulf et al. | |
| 6,157,214 A | 12/2000 | Marshall | |
| 6,170,051 B1 | 1/2001 | Dowling | |
| 6,172,520 B1 | 1/2001 | Lawman et al. | |
| 6,173,419 B1 | 1/2001 | Barnett | |
| 6,173,434 B1 | 1/2001 | Wirthlin et al. | |
| 6,178,494 B1 | 1/2001 | Casselman | |
| 6,185,256 B1 | 2/2001 | Saito et al. | |
| 6,185,731 B1 | 2/2001 | Maeda et al. | |
| 6,188,240 B1 | 2/2001 | Nakaya | |
| 6,188,650 B1 | 2/2001 | Hamada et al. | |
| 6,198,304 B1 | 3/2001 | Sasaki | |
| 6,201,406 B1 | 3/2001 | Iwanczuk et al. | |
| 6,202,163 B1 | 3/2001 | Gabzdyl et al. | |
| 6,202,182 B1 | 3/2001 | Abramovici et al. | |
| 6,204,687 B1 | 3/2001 | Schultz et al. | |
| 6,211,697 B1 | 4/2001 | Lien et al. | |
| 6,212,544 B1 | 4/2001 | Borkenhagen et al. | |
| 6,212,650 B1 | 4/2001 | Guccione | |
| 6,215,326 B1 | 4/2001 | Jefferson et al. | |
| 6,216,223 B1 | 4/2001 | Revilla et al. | |
| 6,219,833 B1 | 4/2001 | Solomon et al. | |
| RE37,195 E | 5/2001 | Kean | |
| 6,230,307 B1 | 5/2001 | Davis et al. | |
| 6,240,502 B1 | 5/2001 | Panwar et al. | |
| 6,243,808 B1 | 6/2001 | Wang | |
| 6,247,147 B1 | 6/2001 | Beenstra et al. | |
| 6,249,756 B1 | 6/2001 | Bunton et al. | |
| 6,252,792 B1 | 6/2001 | Marshall et al. | |
| 6,256,724 B1 | 7/2001 | Hocevar et al. | |
| 6,260,114 B1 | 7/2001 | Schug | |
| 6,260,179 B1 | 7/2001 | Ohsawa et al. | |
| 6,262,908 B1 | 7/2001 | Marshall et al. | |
| 6,263,430 B1 | 7/2001 | Trimberger et al. | |
| 6,266,760 B1 | 7/2001 | DeHon et al. | |
| 6,279,077 B1 | 8/2001 | Nasserbakht et al. | |
| 6,282,627 B1 | 8/2001 | Wong et al. | |
| 6,282,701 B1 | 8/2001 | Wygodny et al. | |
| 6,285,624 B1 | 9/2001 | Chen | |
| 6,286,134 B1 | 9/2001 | Click, Jr. et al. | |
| 6,288,566 B1 | 9/2001 | Hanrahan et al. | |
| 6,289,440 B1 | 9/2001 | Casselman | |
| 6,298,043 B1 | 10/2001 | Mauger et al. | |
| 6,298,472 B1 | 10/2001 | Phillips et al. | |
| 6,301,706 B1 | 10/2001 | Maslennikov et al. | |
| 6,311,200 B1 | 10/2001 | Hanrahan et al. | |
| 6,311,265 B1 | 10/2001 | Beckerle et al. | |
| 6,321,298 B1 | 11/2001 | Hubis | |
| 6,321,366 B1 | 11/2001 | Tseng et al. | |
| 6,321,373 B1 | 11/2001 | Ekanadham et al. | |
| 6,338,106 B1 | 1/2002 | Vorbach et al. | |
| 6,339,424 B1 | 1/2002 | Ishikawa et al. | |
| 6,339,840 B1 | 1/2002 | Kothari et al. | |
| 6,341,318 B1 | 1/2002 | Dakhil | |
| 6,347,346 B1 | 2/2002 | Taylor | |
| 6,349,346 B1 | 2/2002 | Hanrahan et al. | |
| 6,353,841 B1 | 3/2002 | Marshall et al. | |
| 6,362,650 B1 | 3/2002 | New et al. | |
| 6,370,596 B1 | 4/2002 | Dakhil | |
| 6,373,779 B1 | 4/2002 | Pang et al. | |
| 6,374,286 B1 * | 4/2002 | Gee et al. | 718/108 |
| 6,378,068 B1 | 4/2002 | Foster et al. | |
| 6,381,624 B1 | 4/2002 | Colon-Bonet et al. | |
| 6,389,379 B1 | 5/2002 | Lin et al. | |
| 6,389,579 B1 | 5/2002 | Phillips et al. | |
| 6,392,912 B1 | 5/2002 | Hanrahan et al. | |
| 6,398,383 B1 | 6/2002 | Huang | |
| 6,400,601 B1 | 6/2002 | Sudo et al. | |
| 6,404,224 B1 | 6/2002 | Azegami et al. | |
| 6,405,185 B1 | 6/2002 | Pechanek et al. | |
| 6,405,299 B1 | 6/2002 | Vorbach et al. | |
| 6,421,808 B1 | 7/2002 | McGeer | |
| 6,421,809 B1 | 7/2002 | Wuytack et al. | |
| 6,421,817 B1 | 7/2002 | Mohan | |
| 6,425,054 B1 | 7/2002 | Nguyen | |
| 6,425,068 B1 | 7/2002 | Vorbach et al. | |
| 6,426,649 B1 | 7/2002 | Fu et al. | |
| 6,427,156 B1 | 7/2002 | Chapman et al. | |
| 6,430,309 B1 | 8/2002 | Pressman et al. | |
| 6,434,642 B1 | 8/2002 | Camilleri et al. | |
| 6,434,695 B1 | 8/2002 | Esfahani et al. | |
| 6,434,699 B1 | 8/2002 | Jones et al. | |
| 6,435,054 B1 | 8/2002 | Nguyen | |
| 6,437,441 B1 | 8/2002 | Yamamoto | |
| 6,438,747 B1 | 8/2002 | Schreiber et al. | |
| 6,449,283 B1 | 9/2002 | Chao et al. | |
| 6,456,628 B1 | 9/2002 | Greim et al. | |
| 6,457,116 B1 | 9/2002 | Mirsky et al. | |
| 6,476,634 B1 | 11/2002 | Bilski | |
| 6,477,643 B1 | 11/2002 | Vorbach et al. | |
| 6,480,937 B1 | 11/2002 | Vorbach et al. | |
| 6,480,954 B2 | 11/2002 | Trimberger et al. | |
| 6,483,343 B1 | 11/2002 | Faith et al. | |
| 6,487,709 B1 | 11/2002 | Keller et al. | |
| 6,490,695 B1 | 12/2002 | Zagorski et al. | |
| 6,496,740 B1 | 12/2002 | Robertson et al. | |
| 6,496,902 B1 | 12/2002 | Faanes et al. | |
| 6,496,971 B1 | 12/2002 | Lesea et al. | |
| 6,504,398 B1 | 1/2003 | Lien et al. | |
| 6,507,898 B1 | 1/2003 | Gibson et al. | |
| 6,507,947 B1 | 1/2003 | Schreiber et al. | |
| 6,513,077 B2 | 1/2003 | Vorbach et al. | |
| 6,516,382 B2 | 2/2003 | Manning | |
| 6,518,787 B1 | 2/2003 | Allegrucci et al. | |
| 6,519,674 B1 | 2/2003 | Lam et al. | |
| 6,523,107 B1 | 2/2003 | Stansfield et al. | |
| 6,525,678 B1 | 2/2003 | Veenstra et al. | |
| 6,526,520 B1 | 2/2003 | Vorbach et al. | |
| 6,538,468 B1 | 3/2003 | Moore | |
| 6,538,470 B1 | 3/2003 | Langhammer et al. | |
| 6,539,415 B1 | 3/2003 | Mercs | |
| 6,539,438 B1 | 3/2003 | Ledzius et al. | |
| 6,539,477 B1 | 3/2003 | Seawright | |
| 6,542,394 B2 | 4/2003 | Marshall et al. | |
| 6,542,844 B1 | 4/2003 | Hanna | |
| 6,542,998 B1 | 4/2003 | Vorbach et al. | |
| 6,553,395 B2 | 4/2003 | Marshall et al. | |

| | | | | | | |
|---|---|---|---|---|---|---|
| 6,567,834 B1 | 5/2003 | Marshall et al. | | 2002/0099759 A1 | 7/2002 | Gootherts |
| 6,571,381 B1 | 5/2003 | Vorbach et al. | | 2002/0103839 A1 | 8/2002 | Ozawa |
| 6,587,939 B1 | 7/2003 | Takano | | 2002/0124238 A1 | 9/2002 | Metzgen |
| 6,606,704 B1 | 8/2003 | Adiletta et al. | | 2002/0138716 A1 | 9/2002 | Master et al. |
| 6,624,819 B1 | 9/2003 | Lewis | | 2002/0143505 A1 | 10/2002 | Drusinsky |
| 6,625,631 B2 | 9/2003 | Ruehle | | 2002/0144229 A1 | 10/2002 | Hanrahan |
| 6,631,487 B1 | 10/2003 | Abramovici et al. | | 2002/0147932 A1 | 10/2002 | Brock et al. |
| 6,633,181 B1 | 10/2003 | Rupp | | 2002/0152060 A1 | 10/2002 | Tseng |
| 6,657,457 B1 | 12/2003 | Hanrahan et al. | | 2002/0162097 A1 | 10/2002 | Meribout |
| 6,658,564 B1* | 12/2003 | Smith et al. .................. 713/100 | | 2002/0165886 A1 | 11/2002 | Lam |
| 6,665,758 B1 | 12/2003 | Frazier et al. | | 2003/0001615 A1 | 1/2003 | Sueyoshi et al. |
| 6,668,237 B1 | 12/2003 | Guccione et al. | | 2003/0014743 A1 | 1/2003 | Cooke |
| 6,681,388 B1 | 1/2004 | Sato et al. | | 2003/0046607 A1 | 3/2003 | Vorbach |
| 6,687,788 B2 | 2/2004 | Vorbach et al. | | 2003/0052711 A1 | 3/2003 | Taylor et al. |
| 6,697,979 B1 | 2/2004 | Vorbach et al. | | 2003/0055861 A1 | 3/2003 | Lai et al. |
| 6,704,816 B1 | 3/2004 | Burke | | 2003/0056062 A1 | 3/2003 | Prabhu |
| 6,708,223 B1 | 3/2004 | Wang et al. | | 2003/0056085 A1 | 3/2003 | Vorbach |
| 6,708,325 B2 | 3/2004 | Cooke et al. | | 2003/0056091 A1 | 3/2003 | Greenberg |
| 6,717,436 B2 | 4/2004 | Kress et al. | | 2003/0056202 A1 | 3/2003 | Vorbach |
| 6,721,830 B2 | 4/2004 | Vorbach et al. | | 2003/0061542 A1 | 3/2003 | Bates et al. |
| 6,725,334 B2 | 4/2004 | Barroso et al. | | 2003/0062922 A1 | 4/2003 | Douglass et al. |
| 6,728,871 B1 | 4/2004 | Vorbach et al. | | 2003/0070059 A1 | 4/2003 | Dally et al. |
| 6,748,440 B1 | 6/2004 | Lisitsa et al. | | 2003/0086300 A1 | 5/2003 | Noyes et al. |
| 6,754,805 B1 | 6/2004 | Juan | | 2003/0093662 A1 | 5/2003 | Vorbach et al. |
| 6,757,847 B1 | 6/2004 | Farkash et al. | | 2003/0097513 A1 | 5/2003 | Vorbach et al. |
| 6,757,892 B1 | 6/2004 | Gokhale et al. | | 2003/0123579 A1 | 7/2003 | Safavi et al. |
| 6,782,445 B1 | 8/2004 | Olgiati et al. | | 2003/0135686 A1 | 7/2003 | Vorbach et al. |
| 6,785,826 B1 | 8/2004 | Durham et al. | | 2003/0154349 A1 | 8/2003 | Berg et al. |
| 6,802,026 B1 | 10/2004 | Patterson et al. | | 2003/0192032 A1 | 10/2003 | Andrade et al. |
| 6,803,787 B1 | 10/2004 | Wicker, Jr. | | 2003/0226056 A1* | 12/2003 | Yip et al. .................... 714/4 |
| 6,820,188 B2 | 11/2004 | Stansfield et al. | | 2004/0015899 A1 | 1/2004 | May et al. |
| 6,829,697 B1 | 12/2004 | Davis et al. | | 2004/0025005 A1 | 2/2004 | Vorbach et al. |
| 6,836,842 B1 | 12/2004 | Guccione et al. | | 2004/0078548 A1 | 4/2004 | Claydon et al. |
| 6,847,370 B2 | 1/2005 | Baldwin et al. | | 2004/0088689 A1 | 5/2004 | Hammes |
| 6,859,869 B1 | 2/2005 | Vorbach | | 2004/0088691 A1 | 5/2004 | Hammes et al. |
| 6,868,476 B2 | 3/2005 | Rosenbluth et al. | | 2004/0168099 A1 | 8/2004 | Vorbach et al. |
| 6,871,341 B1 | 3/2005 | Shyr | | 2004/0199688 A1 | 10/2004 | Vorbach et al. |
| 6,874,108 B1 | 3/2005 | Abramovici et al. | | 2005/0066213 A1 | 3/2005 | Vorbach et al. |
| 6,886,092 B1 | 4/2005 | Douglass et al. | | 2005/0091468 A1 | 4/2005 | Morita et al. |
| 6,901,502 B2 | 5/2005 | Yano et al. | | 2005/0144210 A1 | 6/2005 | Simkins et al. |
| 6,928,523 B2 | 8/2005 | Yamada | | 2005/0144212 A1 | 6/2005 | Simkins et al. |
| 6,957,306 B2 | 10/2005 | So et al. | | 2005/0144215 A1 | 6/2005 | Simkins et al. |
| 6,961,924 B2 | 11/2005 | Bates et al. | | 2006/0036988 A1 | 2/2006 | Allen et al. |
| 6,977,649 B1 | 12/2005 | Baldwin et al. | | 2006/0230094 A1 | 10/2006 | Simkins et al. |
| 7,000,161 B1* | 2/2006 | Allen et al. .................. 714/725 | | 2006/0230096 A1 | 10/2006 | Thendean et al. |
| 7,007,096 B1 | 2/2006 | Lisitsa et al. | | 2007/0050603 A1 | 3/2007 | Vorbach et al. |
| 7,010,687 B2 | 3/2006 | Ichimura | | 2007/0083730 A1 | 4/2007 | Vorbach et al. |
| 7,028,107 B2 | 4/2006 | Vorbach et al. | | 2008/0313383 A1 | 12/2008 | Morita et al. |
| 7,036,114 B2 | 4/2006 | McWilliams et al. | | 2009/0085603 A1* | 4/2009 | Paul et al. .................... 326/8 |
| 7,038,952 B1 | 5/2006 | Zack et al. | | 2009/0193384 A1 | 7/2009 | Sima et al. |
| 7,043,416 B1 | 5/2006 | Lin | | 2010/0306602 A1* | 12/2010 | Kamiya et al. .................. 714/56 |
| 7,144,152 B2 | 12/2006 | Rusu et al. | | | | |
| 7,155,708 B2 | 12/2006 | Hammes et al. | | FOREIGN PATENT DOCUMENTS | | |
| 7,164,422 B1 | 1/2007 | Wholey et al. | | DE | 44 16 881 | 11/1994 |
| 7,210,129 B2 | 4/2007 | May et al. | | DE | 38 55 673 | 11/1996 |
| 7,216,204 B2 | 5/2007 | Rosenbluth et al. | | DE | 196 51 075 | 6/1998 |
| 7,237,087 B2 | 6/2007 | Vorbach et al. | | DE | 196 54 593 | 7/1998 |
| 7,249,351 B1 | 7/2007 | Songer et al. | | DE | 196 54 595 | 7/1998 |
| 7,254,649 B2 | 8/2007 | Subramanian et al. | | DE | 196 54 846 | 7/1998 |
| 7,340,596 B1* | 3/2008 | Crosland et al. ............. 713/100 | | DE | 197 04 044 | 8/1998 |
| 7,346,644 B1 | 3/2008 | Langhammer et al. | | DE | 197 04 728 | 8/1998 |
| 7,350,178 B1* | 3/2008 | Crosland et al. ................ 716/17 | | DE | 197 04 742 | 9/1998 |
| 7,455,450 B2 | 11/2008 | Liu et al. | | DE | 198 22 776 | 3/1999 |
| 7,595,659 B2 | 9/2009 | Vorbach et al. | | DE | 198 07 872 | 8/1999 |
| 7,657,877 B2 | 2/2010 | Vorbach et al. | | DE | 198 61 088 | 2/2000 |
| 7,759,968 B1* | 7/2010 | Hussein et al. ................ 326/38 | | DE | 199 26 538 | 12/2000 |
| 7,873,811 B1 | 1/2011 | Wolinski et al. | | DE | 100 28 397 | 12/2001 |
| 7,971,051 B2* | 6/2011 | Paul et al. .................... 713/100 | | DE | 100 36 627 | 2/2002 |
| 2001/0001860 A1 | 5/2001 | Beiu | | DE | 101 29 237 | 4/2002 |
| 2001/0010074 A1 | 7/2001 | Nishihara et al. | | DE | 102 04 044 | 8/2003 |
| 2001/0018733 A1 | 8/2001 | Fujii et al. | | EP | 0 208 457 | 1/1987 |
| 2001/0032305 A1 | 10/2001 | Barry | | EP | 0 221 360 | 5/1987 |
| 2002/0010853 A1 | 1/2002 | Trimberger et al. | | EP | 0 398 552 | 11/1990 |
| 2002/0013861 A1 | 1/2002 | Adiletta et al. | | EP | 0 428 327 | 5/1991 |
| 2002/0038414 A1 | 3/2002 | Taylor et al. | | EP | 0 463 721 | 1/1992 |
| 2002/0045952 A1 | 4/2002 | Blemel | | EP | 0 477 809 | 4/1992 |
| 2002/0051482 A1 | 5/2002 | Lomp | | EP | 0 485 690 | 5/1992 |
| 2002/0073282 A1 | 6/2002 | Chauvel et al. | | EP | 0 497 029 | 8/1992 |
| 2002/0083308 A1 | 6/2002 | Pereira et al. | | EP | 0 539 595 | 5/1993 |

| | | |
|---|---|---|
| EP | 0 638 867 A2 | 8/1994 |
| EP | 0 628 917 | 12/1994 |
| EP | 0 678 985 | 10/1995 |
| EP | 0 686 915 | 12/1995 |
| EP | 0 707 269 | 4/1996 |
| EP | 0 735 685 | 10/1996 |
| EP | 0 835 685 | 10/1996 |
| EP | 0 746 106 | 12/1996 |
| EP | 0 748 051 | 12/1996 |
| EP | 0 726 532 | 7/1998 |
| EP | 0 926 594 | 6/1999 |
| EP | 1 102 674 | 7/1999 |
| EP | 1 061 439 | 12/2000 |
| EP | 1 115 204 | 7/2001 |
| EP | 1 146 432 | 10/2001 |
| EP | 0 696 001 | 12/2001 |
| EP | 1 669 885 | 6/2006 |
| FR | 2 752 466 | 2/1998 |
| GB | 2 304 438 | 3/1997 |
| JP | 58-58672 | 4/1983 |
| JP | 1044571 | 2/1989 |
| JP | 01-229378 | 9/1989 |
| JP | 2-130023 | 5/1990 |
| JP | 2-226423 | 9/1990 |
| JP | 5-276007 | 10/1993 |
| JP | 5-509184 | 12/1993 |
| JP | 06-266605 | 9/1994 |
| JP | 07-086921 | 3/1995 |
| JP | 7-154242 | 6/1995 |
| JP | 7-182160 | 7/1995 |
| JP | 7-182167 | 7/1995 |
| JP | 8-44581 | 2/1996 |
| JP | 8-069447 | 3/1996 |
| JP | 08-101761 | 4/1996 |
| JP | 08-102492 | 4/1996 |
| JP | 8-106443 | 4/1996 |
| JP | 08-148989 | 6/1996 |
| JP | 08-221164 | 8/1996 |
| JP | 8-250685 | 9/1996 |
| JP | 9-27745 | 1/1997 |
| JP | 9-237284 | 9/1997 |
| JP | 09-294069 | 11/1997 |
| JP | 11-046187 | 2/1999 |
| JP | 11-307725 | 11/1999 |
| JP | 2000-076066 | 3/2000 |
| JP | 2000-181566 | 6/2000 |
| JP | 2000-311156 | 11/2000 |
| JP | 2001-500682 | 1/2001 |
| JP | 2001-510650 | 7/2001 |
| JP | 2001-236221 | 8/2001 |
| JP | 2002-0033457 | 1/2002 |
| WO | WO90/04835 | 5/1990 |
| WO | WO90/11648 | 10/1990 |
| WO | WO92/01987 | 2/1992 |
| WO | WO93/11503 | 6/1993 |
| WO | WO94/06077 | 3/1994 |
| WO | WO94/08399 | 4/1994 |
| WO | WO95/00161 | 1/1995 |
| WO | WO95/26001 | 9/1995 |
| WO | WO98/10517 | 3/1998 |
| WO | WO98/26356 | 6/1998 |
| WO | WO98/28697 | 7/1998 |
| WO | WO98/29952 | 7/1998 |
| WO | WO98/31102 | 7/1998 |
| WO | WO98/35294 | 8/1998 |
| WO | WO98/35299 | 8/1998 |
| WO | WO99/00731 | 1/1999 |
| WO | WO99/00739 | 1/1999 |
| WO | WO99/12111 | 3/1999 |
| WO | WO99/32975 | 7/1999 |
| WO | WO 9940522 A2 * | 8/1999 |
| WO | WO99/44120 | 9/1999 |
| WO | WO99/44147 | 9/1999 |
| WO | WO00/17771 | 3/2000 |
| WO | WO00/38087 | 6/2000 |
| WO | 00/45282 | 8/2000 |
| WO | WO00/49496 | 8/2000 |
| WO | WO00/77652 | 12/2000 |
| WO | WO01/55917 | 8/2001 |
| WO | WO02/13000 | 2/2002 |
| WO | WO02/21010 | 3/2002 |
| WO | WO02/29600 | 4/2002 |
| WO | WO02/50665 | 6/2002 |
| WO | WO02/071196 | 9/2002 |
| WO | WO02/071248 | 9/2002 |
| WO | WO02/071249 | 9/2002 |
| WO | WO02/103532 | 12/2002 |
| WO | WO03/017095 | 2/2003 |
| WO | WO03/023616 | 3/2003 |
| WO | WO03/025781 | 3/2003 |
| WO | WO03/032975 | 4/2003 |
| WO | WO03/036507 | 5/2003 |
| WO | 03/091875 | 11/2003 |
| WO | WO2004/053718 | 6/2004 |
| WO | WO2004/114128 | 12/2004 |
| WO | WO2005/045692 | 5/2005 |
| WO | WO 2007/030395 | 3/2007 |

OTHER PUBLICATIONS

Translation of DE 101 39 170 by examiner using Google Translate; 10 pages.*

Li et al. (Li) (Hardware-Software Co-Design of Embedded Reconfigurable Architectures); Proceeding—DAC '00 Proceedings of the 37th Annual Design Automation Conference—2000—6 pages.*

Arabi et al., "PLD Integrates Dedicated High-speed Data Buffering, Complex State Machine, and Fast Decode Array," conference record on WESCON '93, Sep. 28, 1993, pp. 432-436.

Ade et al., "Minimum Memory Buffers in DSP Applications," Electronics Letters, vol. 30, No. 6, Mar. 17, 1994, pp. 469-471.

Villasenor, John et al., "Configurable Computing " *Scientific American*, vol. 276, No. 6, Jun. 1997, pp. 66-71.

Villasenor, John et al., "Configurable Computing Solutions for Automatic Target Recognition," *IEEE*, 1996 pp. 70-79.

Tau, Edward et al., "A First Generation DPGA Implementation," *FPD'95*, pp. 138-143.

Athanas, Peter et al., "IEEE Symposium on FPGAs for Custom Computing Machines," *IEEE Computer Society Press*, Apr. 19-21, 1995, pp. i-vii, 1-222.

Athanas, Peter et al., "An Adaptive Hardware Machine Architecture and Compiler for Dynamic Processor Reconfiguration", IEEE, Laboratory for Engineering Man/Machine Systems Division of Engineering, Box D, Brown University Providence, Rhode Island, 1991, pp. 397-400.

Bittner, Ray A. Jr., "Wormhole Run-time Reconfiguration: Conceptualization and VLSI Design of a High Performance Computing System," *Dissertation*, Jan. 23, 1997, pp. I-XX, 1-415.

Myers, G. "Advances in Computer Architecture," Wiley-Interscience Publication, 2nd ed., John Wiley & Sons, Inc. pp. 463-94, 1978.

M. Saleeba, "A Self-Contained Dynamically Reconfigurable Processor Architecture," Sixteenth Australian Computer Science Conference, ASCS-16, QLD, Australia, Feb. 1993.

M. Morris Mano, "Digital Design," by Prentice Hall, Inc., Englewood Cliffs, New Jersey 07632, 1984, pp. 119-125, 154-161.

Maxfield, C. "Logic that Mutates While-U-Wait" EDN (Bur. Ed) (USA), EDN (European Edition), Nov. 7, 1996, Cahners Publishing, USA.

Norman, Richard S., "Hyperchip Business Summary, The Opportunity," Jan. 31, 2000, pp. 1-3.

Ferrante J. et al., "The Program Dependence Graph and its Use in Optimization ACM Transactions on Programming Languages and Systems," Jul. 1987, USA, [online] Bd. 9, Nr., 3, pp. 319-349, XP002156651 ISSN: 0164-0935 ACM Digital Library.

Hwang L et al., "Min-cut Replication in Partitioned Networks" IEEE Transactions on Computer-Aided Design of Integrated Circuits and Systems, [online] Bd. 14, Nr. 1, Jan. 1995, pp. 96-106, XP00053228 USA ISSN: 0278-0070 IEEE Xplore.

Baumgarte, V., et al., PACT XPP "A Self-reconfigurable Data Processing Architecture," PACT Info. GMBH, Munchen Germany 2001.

Jantsch, Axel et al., "A Case Study on Hardware/software Partitioning," Royal Institute of Technology, Kista, Sweden, Apr. 10, 1994 IEEE, pp. 111-118.

Becker, J. et al., "Parallelization in Co-compilation for Configurable Accelerators—a Host/accelerator Partitioning Compilation Method," proceedings of Asia and South Pacific Design Automation Conference, Yokohama, Japan, Feb. 10-13, 1998.

Isshiki, Tsuyoshi et al., "Bit-Serial Pipeline Synthesis for Multi-FPGA Systems with C++ Design Capture," 1996 IEEE, pp. 38-47.

Weinhardt, Markus, "Ubersetzingsmethoden fur strukturprogrammierbare rechner ," Dissertation for Doktors der Ingenieurwissenschaften der Universitat Karlsruhe: Jul. 1, 1997.

Hammes, Jeff et al., "Cameron: High Level Language Compilation for Reconfigurable Systems," Department of Computer Science, Colorado State University, Conference on Parallel Architectures and Compilation Techniques, Oct. 12-16, 1999.

K. Wada et al., "A Performance Evaluation of Tree-based Coherent Distributed Shared Memory" Proceedings of the Pacific RIM Conference on Communications, Comput and Signal Processing, Victoria, May 19-21, 1993.

Nilsson et al., "The Scalable Tree Protocol—A Cache Coherence Approaches for Large-Scale Multiprocessors" IEEE, pp. 498-506 Dec. 1992.

Wu et al., "A New Cache Directory Scheme", IEEE, pp. 466-472, Jun. 1996.

Hauck "The Roles of FPGA's in Reprogrammable Systems," IEEE, Apr. 1998, pp. 615-638.

Wittig et al., "OneChip: An FPGA Processor with Reconfigurable Logic" IEEE, 1996 pp. 126-135.

Cadambi et al., "Managing pipeline-reconfigurable FPGAs," ACM, 1998, pp. 55-64.

Hong Yu Xu et al., "Parallel QR Factorization on a Block Data Flow Architecture" Conference Proceeding Article, Mar. 1, 1992, pp. 332-336 XPO10255276, p. 333, Abstract 2.2, 2.3, 2.4—p. 334.

Mirsky, E. DeHon, "MATRIX: A Reconfigurable Computing Architecture with Configurable Instruction Distribution and Deployable Resources," Proceedings of the IEEE Symposium on FPGAs for Custom Computing Machines, 1996, pp. 157-1666.

Weinhardt, M. "Compilation Methods for Structure-programmable Computers", dissertation, ISBN 3-89722-011-3, 1997.

Cardoso, J.M.P., "Compilation of Java™ Algorithms onto Reconfigurable Computing Systems with Exploitation of Operation-Level Parallelism," Ph.D. Thesis, Universidade Tecnica de Lisboa (UTL), Lisbon, Portugal Oct. 2000 (English Abstract included).

Kung, "Deadlock Avoidance for Systolic Communication", 1988 Conference Proceedings of 15$^{th}$ Annual International Symposium on Computer Architecture, May 30, 1988, pp. 252-260.

TMS320C54X DSP: CPU and Peripherals, Texas Instruments, 1996, pp. 6-26 to 6-46.

TMS320C54x DSP: Mnemonic Instruction Set, Texas Instruments, 1996, p. 4-64.

XLINX, "Logic Cell Array Families: XC4000, XC4000A and XC4000H" , product description, pp. 2-7 to 2-15, Additional XC3000, XC31000 and XC3100A Data, pp. 8-16 and 9-14.

Miller, Michael J. et al., "High-Speed FIFOs Contend with Widely Differing Data Rates: Dual-port RAM Buffer and Dual-pointer System Provide Rapid, High-density Data Storage and Reduce Overhead", Computer Design, Sep. 1, 1985, pp. 83-86.

Forstner, Peter "Wer Zuerst Kommt, Mahlt Zuerst!: Teil 3: Einsatzgebiete mid Anwendungsbeispiele von FIFO-Speichern", Elektronik, Aug. 2000, pp. 104-109.

John R. Hauser et al., "Garp: A MIPS Processor with a Reconfigurable Coprocessor", University of California, Berkeley, IEEE, 1997, pp. 12-21.

Jorg Donandt, "Improving Response Time of Programmable Logic Controllers by Use of a Boolean Coprocessor", AEG Research Institute Berlin, IEEE, 1989, pp. 4-167-4-169.

Alexandre F. Tenca et al., "A Variable Long-Precision Arithmetic Unit Design for Reconfigurable Coprocessor Architectures", University of California, Los Angeles, 1998, pp. 216-225.

Andreas Koch et al, "Practical Experiences with the SPARXIL Co-Processor", 1998, IEEE, pp. 394-398.

Gokhale M. B. et al., "Automatic Allocation of Arrays to Memories in FPGA processors with Multiple Memory Banks", Field-Programmable Custom Computing Machines, 1999, IEEE, pp. 63-67.

Christian Siemers, "Rechenfabrik Ansaetze Fuer Extrem Parallele Prozessoren", Verlag Heinze Heise GmbH., Hannover, DE No. 15, Jul. 16, 2001, pp. 170-179.

Pedro Diniz et al., "Automatic Synthesis of Data Storage and Control Structures for FPGA-based Computing Engines", 2000, IEEE, pp. 91-100.

Markus Weinhardt et al., "Pipeline Vectorization for Reconfigurable Systems", 1999, IEEE, pp. 52-60.

Abnous, A., et al., "The Pleiades Architecture," Chapter I of *The Application of Programmable DSPs in Mobile Communications*, A. Gatherer and A. Auslander, Ed., Wiley, 2002, pp. 1-33.

Alippi, et al., "Determining the Optimum Extended Instruction Set Architecture for Application Specific Reconfigurable VLIW CPUs," IEEE, 2001, pp. 50-56.

Athanas, "A Functional Reconfigurable Architecture and Compiler for Adoptive Computing," IEEE 1993, pp. 49-55.

Beck et al., "From control flow to data flow," TR 89-1050, Oct. 1989, Dept. of Computer Science, Cornell University, Ithaca, NY, pp. 1-25.

Callahan, et al., "The Garp Architecture and C Compiler," Computer, Apr. 2000, pp. 62-69.

Cardoso, Joao M.P. and Markus Weinhardt, "XPP-VC: A C Compiler with Temporal Partitioning for the PACT-XPP Architecture," Field-Programmable Logic and Applications. Reconfigurable Computing is Going Mainstream, 12$^{th}$ International Conference FPL 2002, Proceedings (Lecture Notes in Computer Science, vol. 2438) Springer-Verlag Berlin, Germany, 2002, pp. 864-874.

Chen et al., "A reconfigurable multiprocessor IC for rapid prototyping of algorithmic-specific high-speed DSP data paths," IEEE Journal of Solid-State Circuits, vol. 27, No. 12, Dec. 1992, pp. 1895-1904.

DeHon, A., "DPGA Utilization and Application," MIT Artificial Intelligence Laboratory, Proceedings of the Fourth International ACM Symposium on Field-Programmable Gate Arrays (FPGA '96) IEEE Computer Society, pp. 1-7.

Dutt, et al., "If Software is King for Systems-in-Silicon, What's New in Compiler?," IEEE, 1997, pp. 322-325.

Fornaciari, et al., System-level power evaluation metrics, 1997 Proceedings of the 2$^{nd}$ Annual IEEE International Conference on Innovative Systems in Silicon, New York, NY, Oct. 1997, pp. 323-330.

Franklin, Manoj et al., "A Fill-Unit Approach to Multiple Instruction Issue," Proceedings of the Annual International Symposium on Microarchitecture, Nov. 1994, pp. 162-171.

Hartenstein, R., "Coarse grain reconfigurable architectures," Design Automation Conference, 2001, Proceedings of the ASP-DAC 2001 Asia and South Pacific, Jan. 30-Feb. 2, 2001, IEEE Jan. 30, 2001, pp. 564-569.

Hastie et al., "The implementation of hardware subroutines on field programmable gate arrays," Custom Integrated Circuits Conference, 1990, Proceedings of the IEEE 1990, May 16, 1990, pp. 31.3.1-31.4.3 (3 pages).

Hedge, S.J., "3D WASP Devices for On-line Signal and Data Processing," 1994, International Conference on Wafer Scale Integration, pp. 11-21.

Iseli, C., et al. "A C++ Compiler for Fpga Custom Execution Units Synthesis," IEEE, 1995, pp. 173-179.

Jacob, J., et al., "Memory Interfacing and Instruction Specification for Reconfigurable Processors," ACM 1999, pp. 145-154.

Kastrup, B., "Automatic Hardware Synthesis for a Hybrid Reconfigurable CPU Featuring Philips CPLDs," Proceedings of the PACT Workshop on Reconfigurable Computing, 1998, pp. 5-10.

Koren et al., "A data-driven VLSI array for arbitrary algorithms," IEEE Computer Society, Long Beach, CA vol. 21, No. 10, Oct. 1, 1988, pp. 30-34.

Lee, Jong-eun et al., "Reconfigurable ALU Array Architecture with Conditional Execution," International Soc. Design Conference (ISOOC) [online] Oct. 25, 2004, Seoul, Korea, 5 pages.

Ling, X., "WASMII: An MPLD with Data-Driven Control on a Virtual Hardware," Journal of Supercomputing, Kluwer Acdemic Publishers, Dordrecht, Netherlands, 1995, pp. 253-276.

Ling et al., "WASMII: A Multifunction Programmable Logic Device (MPLD) with Data Driven Control," The Transactions of the Institute of Electronics, Information and Communication Engineers, Apr. 25, 1994, vol. J77-D-1, Nr. 4, pp. 309-317.

Ozawa, Motokazu et al., "A Cascade ALU Architecture for Asynchronous Super-Scalar Processors," IEICE Transactions on Electronics, Electronics Society, Tokyo, Japan, vol. E84-C, No. 2, Feb. 2001, pp. 229-237.
Piotrowski, A., "IEC-BUS, Die Funktionsweise des IEC-Bus unde seine Anwendung in Gersten and Systemen," 1987, Franzis-Verlag GmbH, München, pp. 20-25.
Razdan et al., A High-Performance Microarchitecure with Hardware-Programmable Functional Units, Micro-27, Proceedings of the 27th Annual International Symposium on Microarchitecture, IEEE Computer Society and Association for Computing Machinery, Nov. 30-Dec. 2, 1994, pp. 172-180.
Schmit, et al., Hidden Markov Modeling and Fuzzy Controllers in FPGAs, FPGAs for Custom Computing machines, 1995; Proceedings, IEEE Symposium in Napa Valley, CA, Apr. 1995, pp. 214-221.
Shirazi, et al., "Quantitative analysis of floating point arithmetic on FPGA based custom computing machines," IEEE Symposium on FPGAs for Custom Computing Machines, *IEEE Computer Society Press*, Apr. 19-21, 1995, pp. 155-162.
Siemers et al., "The .>S<puter. A Novel Micoarchitecture Mode for Execution inside Superscalar and VLIW Processors Using Reconfigurable Hardware," Australian Computer Science Communications, vol. 20, No. 4, Computer Architecture, Proceedings of the 3rd Australian Computer Architecture Conference, Perth, John Morris, Ed., Feb. 2-3, 1998, pp. 169-178.
Simunic, et al., Source Code Optimization and Profiling of Energy Consumption in Embedded Systems, Proceedings of the 13th International Symposium on System Synthesis, Sep. 2000, pp. 193-198.
Skokan, Z.E., "Programmable logic machine (A programmable cell array)," IEEE Journal of Solid-State Circuits, vol. 18, Issue 5, Oct. 1983, pp. 572-578.
Sueyoshi, T, "Present Status and Problems of the Reconfigurable Computing Systems Toward the Computer Evolution," Department of Artificial Intelligence, Kyushi Institute of Technology, Fukuoka, Japan; Institute of Electronics, Information and Communication Engineers, vol. 96, No. 426, IEICE Technical Report (1996), pp. 111-119 [English Abstract Only].
The XPP White Paper, Release 2.1, Pact—A Technical Perspective, Mar. 27, 2002, pp. 1-27.
Villasenor, et al., "Express Letters Video Communications Using Rapidly Reconfigurable Hardware," IEEE Transactions on Circuits and Systems for Video Technology, IEEE, Inc., NY, Dec. 1995, pp. 565-567.
Weinhardt, Markus et al., "Pipeline Vectorization," IEEE Transactions on Computer-Aided Design of Integrated Circuits and Systems, vol. 20, No. 2, Feb. 2001, pp. 234-248.
Ye, Z.A. et al., "A C-Compiler for a Processor With a Reconfigurable Functional Unit," FPGA 2000 ACM/SIGNA International Symposium on Field Programmable Gate Arrays, Monterey, CA Feb 9-11, 2000, pp. 95-100.
Yeung, A. et al., "A data-driven architecture for rapid prototyping of high throughput DSP algorithms," Dept. of Electrical Engineering and Computer Sciences, Univ. of California, Berkeley, USA, *Proceedings VLSI Signal Processing Workshop. IEEE Press*, pp. 225-234, Napa, Oct. 1992.
Yeung, A. et al., "A reconfigurable data-driven multiprocessor architecture for rapid prototyping of high throughput DSP algorithms," Dept. of Electrical Engineering and Computer Sciences, Univ. of California, Berkeley, USA, pp. 169-178, *IEEE* 1993.
Zhang, et al., Architectural Evaluation of flexible Digital Signal Processing for Wireless Receivers, Signals, Systems and Computers, 2000; Conference Record of the Thirty-Fourth Asilomar Conference, Bd. 1; Oct. 29, 2000, pp. 78-83.
Abnous, A. et al., "Ultra-Low-Power Domain-Specific Multimedia Processors," U.C. Berkeley, 1996 IEEE, pp. 461-470.
Sutton et al., "A Multiprocessor DSP System Using PADDI-2," U.C. Berkeley, 1998 ACM, pp. 62-65.
Zhang, et al., "Abstract: Low-Power Heterogeneous Reconfigurable Digital Signal Processors with Energy-Efficient Interconnect Network," U.C. Berkeley (2004), pp. 1-120.
Advanced RISC Machines, "Introduction to AMBA," Section 1, pp. 1-1 to 1-7 (Oct. 1996).

ARM, "The Architecture for the Digital World," http://www.arm.com/products, 3 pages (Mar. 18, 2009).
ARM, "The Architecture for the Digital World; Milestones," http://www.arm.corn/aboutarm/milestones.html, 5 pages (Mar. 18, 2009).
Asari, et al., "FeRAM circuit technology for system on a chip," Proceedings First NASA/DoD Workshop on Evolvable Hardware, pp. 193-197 (1999).
Cardoso, et al., "Compilation and Temporal Partitioning for a Coarse-Grain Reconfigurable Architecture," Lysacht, P. & Rosentiel, W. eds., "New Algorithms, Architectures and Applications for Reconfigurable Computing," pp. 105-115 (2005).
Cardoso, J.M.P. et al., "Macro-Based Hardware Compilation of Java™ Bytecodes into a Dynamic Reconfigurable Computing System," Field-Programmable Custom Computing Machines (1999) FCCM '99. Proceedings. Seventh Annual IEEE Symposium on Napa Valley, CA, USA, Apr. 21-23, 1999, IEEE Comput. Soc, US, (Apr. 21, 1999) pp. 2-11.
Cook, "The Amalgam Compiler Infrastructure," Thesis at the University of Illinois at Urbana-Champaign, Ch. 7 & Appendix G (2004).
Del Corso, et al., "Microcomputer Buses and Links," Academic Press Inc. Ltd., pp. 138-143, 277-285 (1986).
Fawcett, "Map, Place and Route: The Key to High-Density PLD Implementation," Wescon Conference, IEEE Center, pp. 292-297 (Nov. 7, 1995).
Hendrich, et al., "Silicon Compilation and Rapid Prototyping of Microprogrammed VLSI-Circuits with MIMOLA and SOLO 1400," Microprocessing & Microprogramming 35(1-5): 287-294 (1992).
"IEEE Standard Test Access Port and Boundary-Scan Architecture," IEEE Std. 1149.1-1990, pp. 1-127 (1993).
Jefferson, et al., U.S. Appl. No. 60/109,417, filed Nov. 18, 1998.
Koch, et al., "High-Level-Language Compilation for Reconfigurable Computers," Proceedings of European Workshop on Reconfigurable Communication-Centric SOCS, 8 pages (2005).
Lee, et al., "Multimedia extensions for general-purpose processors," IEEE Workshop on Signal Processing Systems, SIPS 97—Design and Implementation, pp. 9-23 (1997).
Mei, et al., "Adres: An Architecture with Tightly Coupled VLIW Processor and Coarse-Grained Reconfigurable Matrix," Proc. Field-Programmable Logic and Applications (FPL 03), Springer, pp. 61-70 (2003).
Moraes, et al., "A Physical Synthesis Design Flow Based on Virtual Components," XV Conference on Design of Circuits and Integrated Systems, 6 pages (2000).
Neumann, et al., "A Generic Library for Adaptive Computing Environments," Field Programmable Logic and Applications, 11th International Conference, FPL 2001, Proceedings (Lecture Notes in Computer Science, vol. 2147), pp. 503-512 (2001).
Ohmsha, "Information Processing Handbook," edited by the Information Processing Society of Japan, pp. 376, Dec. 21, 1998.
PCI Local Bus Specification, Production Version, Revision 2.1, Portland, OR, pp. 1-281 (Jun. 1, 1995).
Pirsch, et al., "VLSI implementations of image and video multimedia processing systems," IEEE Transactions on Circuits and Systems for Video Technology 8(7): 878-891 (Nov. 1998).
Salefski, et al., "Re-configurable computing in wireless," Annual ACM IEEE Design Automation Conference: Proceedings of the 38th conference on Design automation, pp. 178-183 (2001).
Schönfeld, et al., "The LISA Design Environment for the Synthesis of Array Processors Including Memories for the Data Transfer and Fault Tolerance by Reconfiguration and Coding Techniques," J. VLSI Signal Processing Systems for Signal, Image, and Video Technology 11(1/2): 51-74 (1995).
Schmidt, et al., "Datawave: A Single-Chip Multiprocessor for Video Applications," IEEE Micro 11(3): 22-25 and 88-94 (Jun. 1991).
Shin, et al., "C-based Interactive RTL Design Methodology," Technical Report CECS-03-42, pp. 1-16 (2003).
Sondervan, "Retiming and logic synthesis," Electronic Engineering 65(793): 33, 35-36 (1993).
"The Programmable Logic Data Book," XILINX, Inc., Section 2, pp. 1-240, Section 8, pp. 1, 23-25, 29, 45-52, 169-172 (1994).
Agarwal, A., et al., "APRIL: A Processor Architecture for Multiprocessing," Laboratory for Computer Science, MIT, Cambridge, MA, IEEE 1990, pp. 104-114.

Almasi and Gottlieb, *Highly Parallel Computing*, The Benjamin/Cummings Publishing Company, Inc., Redwood City, CA, 1989, 3 pages (Fig. 4.1).
Advanced RISC Machines Ltd (ARM), "AMBA—Advanced Microcontroller Bus Architecture Specification," (Document No. ARM IHI 0001C), Sep. 1995, 72 pages.
Alike, Peter; New, Bernie, *Xilinx Application Note*, "Additional XC3000 Data," XAPP 024.000, 1994, pp. 8-11 through 8-20.
Alike, Peter; New, Bernie, *Xilinx Application Note*, "Adders, Subtracters and Accumulators in XC3000," XAPP 022.000, 1994, pp. 8-98 through 8-104.
Alike, Peter, *Xilinx Application Note*, "Megabit FIFO in Two Chips: One LCA Device and One DRAM," XAPP 030.000, 1994, pp. 8-148 through 8-150.
Alike, Peter, *Xilinx Application Note*, "Dynamic Reconfiguration," XAPP 093, Nov. 10, 1997, pp. 13-45 through 13-46.
Alike, Peter; New, Bernie, *Xilinx Application Note*, "Implementing State Machines in LCA Devices," XAPP 027.001, 1994, pp. 8-169 through 8-172.
Algotronix, Ltd., CAL64K Preliminary Data Sheet, Apr. 1989, pp. 1-24.
Algotronix, Ltd., CAL4096 Datasheet, 1992, pp. 1-53.
Algotronix, Ltd., CHS2x4 User Manual, "CHA2x4 Custom Computer," 1991, pp. 1-38.
Allaire, Bill; Fischer, Bud, *Xilinx Application Note*, "Block Adaptive Filter," XAPP 055, Aug. 15, 1996 (Version 1.0), pp. 1-10.
Altera Application Note (73), "Implementing FIR Filters in FLEX Devices," Altera Corporation, Feb. 1998, ver. 1.01, pp. 1-23.
Athanas, P. (Thesis), "An adaptive machine architecture and compiler for dynamic processor reconfiguration," Brown University 1992, pp. 1-157.
Berkeley Design Technology, Inc., *Buyer's Guide to DSP Processors*, 1995, Fremont, CA., pp. 673-698.
Bittner, R. et al., "Colt: An Experiment in Wormhole Run-Time Reconfiguration," Bradley Department of Electrical and Computer Engineering, Blacksburg, VA, SPIE—International Society for Optical Engineering, vol. 2914/187, Nov. 1996, Boston, MA, pp. 187-194.
Camilleri, Nick; Lockhard, Chris, *Xilinx Application Note*, "Improving XC4000 Design Performance," XAPP 043.000, 1994, pp. 8-21 through 8-35.
Cartier, Lois, *Xilinx Application Note*, "System Design with New XC4000EX I/O Features," Feb. 21, 1996, pp. 1-8.
Chen, D., (Thesis) "Programmable arithmetic devices for high speed digital signal processing," U. California Berkeley 1992, pp. 1-175.
Churcher, S., et al., "The XC6200 FastMap TM Processor Interface," Xilinx, Inc., Aug. 1995, pp. 1-8.
Cowie, Beth, *Xilinx Application Note*, "High Performance, Low Area, Interpolator Design for the XC6200," XAPP 081, May 7, 1997 (Version 1.0), pp. 1-10.
Duncan, Ann, Xilinx Application Note, "A32x16 Reconfigurable Correlator for the XC6200," XAPP 084, Jul. 25, 1997 (Version 1.0), pp. 1-14.
Ebeling, C., et al., "RaPiD—Reconfigurable Pipelined Datapath," Dept. of Computer Science and Engineering, U. Washington, 1996, pp. 126-135.
Epstein, D., "IBM Extends DSP Performance with Mfast—Powerful Chip Uses Mesh Architecture to Accelerate Graphics, Video," 1995 MicroDesign Resources, vol. 9, No. 16, Dec. 4, 1995, pp. 231-236.
Fawcett, B., "New Sram-Based FPGA Architectures Address New Applications," Xilinx, Inc. San Jose, CA, Nov. 1995, pp. 231-236.
Goslin, G; Newgard,13, *Xilinx Application Note*, "16-Tap, 8-Bit FIR Filter Applications Guide," Nov. 21, 1994, pp. 1-5.
Iwanczuk, Roman, *Xilinx Application Note*, "Using the XC4000 RAM Capability," XAPP 031.000, 1994, pp. 8-127 through 8-138.
Knapp, Steven, "Using Programmable Logic to Accelerate DSP Functions," Xilinx, Inc., 1995, pp. 1-8.
New, Bernie, *Xilinx Application Note*, "Accelerating Loadable Counters in SC4000," XAPP 023.001, 1994, pp. 8-82 through 8-85.
New, Bernie, *Xilinx Application Note*, "Boundary Scan Emulator for XC3000," XAPP 007.001, 1994, pp. 8-53 through 8-59.
New, Bernie, *Xilinx Application Note*, "Ultra-Fast Synchronous Counters," XAPP 014.001, 1994, pp. 8-78 through 8-81.
New, Bernie, *Xilinx Application Note*, "Using the Dedicated Carry Logic in XC4000," XAPP 013.001, 1994, pp. 8-105 through 8-115.
New, Bernie, *Xilinx Application Note*, "Complex Digital Waveform Generator," XAPP 008.002, 1994, pp. 8-163 through 8-164.
New, Bernie, Xilinx Application Note "Bus-Structured Serial Input-Output Device," Xapp 010.001, 1994, pp. 8-181 through 8-182.
Ridgeway, David, *Xilinx Application Note*, "Designing Complex 2-Dimensional Convolution Filters," XAPP 037.000, 1994, pp. 8-175 through 8-177.
Rowson, J., et al., "Second-generation compilers optimize semicustom circuits," Electronic Design, Feb. 19, 1987, pp. 92-96.
Schewel, J., "A Hardware/Software Co-Design System using Configurable Computing Technology," Virtual Computer Corporation, Reseda, CA, IEEE 1998, pp. 620-625.
Segers, Dennis, *Xilinx Memorandum*, "MIKE—Product Description and MRD," Jun. 8, 1994, pp. 1-29.
Texas Instruments, "TMS320C8x System-Level Synopsis," Sep. 1995, 75 pages.
Texas Instruments, "TMS320C80 Digital Signal Processor," Data Sheet, Digital Signal Processing Solutions 1997, 171 pages.
Texas Instruments, "TMS320C80 (MVP) Parallel Processor," User's Guide, Digital Signal Processing Products 1995, 73 pages.
Trainor, D.W., et al., "Implementation of the 2D DCT Using a Xilinx XC6264 FPGA," 1997, IEEE Workshop of Signal Processing Systems SiPS 97, pp. 541-550.
Trimberger, S, (Ed.) et al., "Field-Programmable Gate Array Technology," 1994, Kluwer Academic Press, pp. 1-258 (and the Title Page, Table of Contents, and Preface) [274 pages total].
Trimberger, S., "A Reprogrammable Gate Array and Applications," IEEE 1993, Proceedings of the IEEE, vol. 81, No. 7, Jul. 1993, pp. 1030-1041.
Trimberger, S., et al., "A Time-Multiplexed FPGA," Xilinx, Inc., 1997 IEEE, pp. 22-28.
Ujvari, Dan, *Xilinx Application Note*, "Digital Mixer in an XC7272," XAPP 035.002, 1994, p. 1.
Veendrick, H., et al., "A 1.5 GIPS video signal processor (VSP)," Philips Research Laboratories, The Netherlands, IEEE 1994 Custom Integrated Circuits Conference, pp. 95-98.
Wilkie, Bill, *Xilinx Application Note*, "Interfacing XC6200 to Microprocessors (TMS320C50 Example)," XAPP 064, Oct. 9, 1996.(Version 1.1), pp. 1-9.
Wilkie, Bill, *Xilinx Application Note*, "Interfacing XC6200 to Microprocessors (MC68020 Example)," XAPP 063, Oct. 9, 1996.(Version 1.1), pp. 1-8.
XCELL, Issue 18, Third Quarter 1995, "Introducing three new FPGA Families!"; "Introducing the XC6200 FPGA Architecture: The First FPGA Architecture Optimized for Coprocessing in Embedded System Applications," 40 pages.
*Xilinx Application Note*, Advanced Product Specification, "XC6200 Field Programmable Gate Arrays," Jun. 1, 1996 (Version 1.0), pp. 4-253-4-286.
*Xilinx Application Note*, A Fast Constant Coefficient Multiplier for the XC6200, XAPP 082, Aug. 24, 1997 (Version 1.0), pp. 1-5.
Xilinx Technical Data, "XC5200 Logic Cell Array Family," Preliminary (v1.0), Apr. 1995, pp. 1-43.
Xilinx Data Book, "The Programmable Logic Data Book," 1996, 909 pages.
Xilinx, Series 6000 User's Guide, Jun. 26, 1997, 223 pages.
Yeung, K., (Thesis) "A Data-Driven Multiprocessor Architecture for High Throughput Digital Signal Processing," Electronics Research Laboratory, U. California Berkeley, Jul. 10, 1995, pp. 1-153.
Yeung, L., et al., "A 2.4GOPS Data-Driven Reconfigurable Multiprocessor IC for DSP," Dept. of EECS, U. California Berkeley, 1995 IEEE International Solid State Circuits Conference, pp. 108-110.
ZILOG Preliminary Product Specification, "Z86C95 CMOS Z8 Digital Signal Processor," 1992, pp. 1-82.
ZILOG Preliminary Product Specification, "Z89120 Z89920 (ROM-less) I6-Bit Mixed Signal Processor," 1992, pp. 1-82.
Defendants' Invalidity Contentions in *PACT XPP Technologies, AG v. XILINX, Inc., et al.*, (E.D. Texas Dec. 28, 2007) (No. 2:07cv563)., including Exhibits a through K in separate PDF files.
Altera, "APEX 20K Programmable Logic Device Family," Altera Corporation Data Sheet, Mar. 2004, ver. 5.1, pp. 1-117.

XILINX, "Virtex-E 1.8 V Extended Memory Field Programmable Gate Arrays," (v2.2) Sep. 10, 2002, Xilinx Production Product Specification, pp. 1-52.
XILNIX, "Virtex-II and Virtex-II Pro X FPGA Platform FPGAs: Complete Data Sheet," (v4.6) Mar. 5, 2007, pp. 1-302.
XILINX, "Virtex-II Platform FPGAs: Complete Data Sheet " (v3.5) Nov. 5, 2007, pp. 1-226.
Albaharna, O.T. et al., "On the Viability of FPGA-Based Integrated Coprocessors," Dept. of Electrical and Electronic Engineering, Imperial College of Science, London, 1999 IEEE, pp. 206-215.
Altera, "Flex 8000 Programmable Logic Device Family," Altera Corporation product description, Jan. 2003, pp. 1-62.
Altera, "Flex 10K Embedded Programmable Logic Device Family," Altera Corporation product description, Jan. 2003, pp. 1-128.
Asari, K. et al., "FeRAM circuit technology for system on a chip," *Proceedings First NASA/DoD Workshop on Evolvable Hardware* (1999), pp. 193-197.
Athanas et al., "Processor Reconfiguration Through Instruction-Set Metamorphosis," 1993, IEEE Computers, pp. 11-18.
Atmel, 5-K-50K Gates Coprocessor FPGA with Free Ram, Data Sheet, Jul. 2006, 55 pages.
Atmel, FPGA-based FIR Filter Application Note, Sep. 1999, 10 pages.
Atmel, "An Introduction to DSP Applications using the AT40K FPGA," FPGA Application Engineering, San Jose, CA, Apr. 2004, 15 pages.
Atmel, Configurable Logic Design & Application Book, Atmel Corporation, 1995, pp. 2-19 through 2-25.
Atmel, Field Programmable Gate Array Configuration Guide, AT6000 Series Configuration Data Sheet, Sep. 1999, pp. 1-20.
Bacon, D. et al., "Compiler Transformations for High-Performance Computing," ACM Computing Surveys, 26(4):325-420 (1994).
Bakkes, P.J., et al., "Mixing Fixed and Reconfigurable Logic for Array Processing," Dept. of Electrical and Electronic Engineering, University of Stellenbosch, South Africa, 1996 IEEE, pp. 118-125.
Becker, J. et al., "Architecture, Memory and Interface Technology Integration of an Industrial/Academic Configurable System-on-Chip (CSoC)," IEEE Computer Society Annual Workshop on VLSI (WVLSI 2003), (Feb. 2003).
Becker, J., "Configurable Systems-on-Chip (CSoC)," (Invited Tutorial), Proc. of 9th Proc. of XV Brazilian Symposium on Integrated Circuit, Design (SBCCI 2002), (Sep. 2002).
Becker et al., "Automatic Parallelism Exploitation for FPL-Based Accelerators," 1998, Proc. 31st Annual Hawaii International Conference on System Sciences, pp. 169-178.
Bratt, A, "Motorola field programmable analogue arrays, present hardware and future trends," Motorola Programmable Technology Centre, Gadbrook Business Centre, Northwich, Cheshire, 1998, The Institute of Electrical Engineers, IEE. Savoy Place, London, pp. 1-5.
Cardoso, J.M.P., et al., "A novel algorithm combining temporal partitioning and sharing of functional units," University of Algarve, Faro, Portugal, 2001 IEEE, pp. 1-10.
Chaudhry, G.M. et al., "Separated caches and buses for multiprocessor system," Circuits and Systems, 1993; Proceedings of the 36th Midwest Symposium on Detroit, MI, USA, Aug. 16-18, 1993, New York, NY IEEE, Aug. 16, 1993, pp. 1113-1116, XP010119918 ISBN: 0-7803-1760-2.
Clearspeed, CSX Processor Architecture, Whitepaper, PN-1110-0702, 2007, pp. 1-15, www.clearspeed.com.
Clearspeed, CSX Processor Architecture, Whitepaper, PN-1110-0306, 2006, pp. 1-14, www.clearspeed.com.
Compton, K., et al., "Configurable Computing: A Survey of Systems and Software," Northwestern University, Dept. of ECE, Technical Report, 1999, (XP-002315148), 39 pages.
Cronquist, D., et al., Architecture Design of Reconfigurable Pipelined Datapaths, Department of Computer Science and Engineering, University of Washington, Seattle, WA, Proceedings of the 20th Anniversary Conference on Advanced Research in VSLI, 1999, pp. 1-15.
Culler, D.E; Singh, J.P., "Parallel Computer Architecture," pp. 434-437, 1999, Morgan Kaufmann, San Francisco, CA USA, XP002477559.

DeHon, Andre, "Reconfigurable Architectures for General-Purpose Computing," Massachusetts Institute of Technology, Technical Report AITR-1586, Oct. 1996, XP002445054, Cambridge, MA, pp. 1-353.
Diniz, P., et al., "A behavioral synthesis estimation interface for configurable computing," University of Southern California, Marina Del Rey, CA, 2001 IEEE, pp. 1-2.
Ebeling, C., et al., "Mapping Applications to the RaPiD Configurable Architecture," Department of Computer Science and Engineering, University of Washington, Seattle, WA, *FPGAs for Custom Computing Machines, 1997. Proceedings., The 5th Annual IEEE Symposium*, Publication Date: Apr. 16-18, 1997, 10 pages.
Equator, Pixels to Packets, Enabling Multi-Format High Definition Video, Equator Technologies BSP-15 Product Brief, www.equator.com, 2001, 4 pages.
Fineberg, S, et al., "Experimental Analysis of a Mixed-Mode Parallel Architecture Using Bitonic Sequence Sorting," Journal of Parallel and Distributed Computing, vol. 11, No. 3, Mar. 1991, pp. 239-251.
Freescale Slide Presentation, An Introduction to Motorola's RCF (Reconfigurable Compute Fabric) Technology, Presented by Frank David, Launched by Freescale Semiconductor, Inc., 2004, 39 pages.
Genius, D., et al., "A Case for Array Merging in Memory Hierarchies," Proceedings of the 9th International Workshop on Compilers for Parallel Computers, CPC'01 (Jun. 2001), 10 pages.
Hartenstein, R. et al., "A new FPGA architecture for word-oriented datapaths," Proc. FPL'94, Springer LNCS, Sep. 1994, pp. 144-155.
Hendrich, N., et al., "Silicon Compilation and Rapid Prototyping of Microprogrammed VLSI-Circuits with MIMOLA and SOLO 1400," Microprocessing & Microprogramming (Sep. 1992) vol. 35(1-5), pp. 287-294.
Hwang, K., "Advanced Computer Architecture—Parallelism, Scalability, Programmability," 1993, McGraw-Hill, Inc., pp. 348-355.
Hwang, K., "Computer Architecture and Parallel Processing," Data Flow Computers and VLSI Computations, XP-002418655, 1985 McGraw-Hill, Chapter 10, pp. 732-807.
IBM Technical Disclosure Bulletin, IBM Corp., New York, XP000424878, Bd. 36, Nr. 11, Nov. 1, 1993, pp. 335-336.
Inside DSP, "Ambric Discloses Massively Parallel Architecture," Aug. 23, 2006, http://www.insidedsp.com/Articles/tabid/64/articleType/ArticleView/articleId/155/Default.aspx, 2 pages.
Intel, Intel MXP5800/MXP5400 Digital Media Processors, Architecture Overview, Jun. 2004, Revision 2.4, pp. 1-24.
Jantsch, Axel et al., "Hardware/Software Partitioning and Minimizing Memory Interface Traffic," Electronic System Design Laboratory, Royal Institute of Technology, ESDLab, Electrum 229, S-16440 Kista, Sweden (Apr. 1994), pp. 226-231.
John, L., et al., "A Dynamically Reconfigurable Interconnect for Array Processors," vol. 6, No. 1, Mar. 1998, IEEE, pp. 150-157.
Kaul, M., et al., "An automated temporal partitioning and loop fission approach of FPGA based reconfigurable synthesis of DSP applications," University of Cincinnati, Cincinnati, OH, ACM 1999, pp. 616-622.
Kean, T.A., "Configurable Logic: A Dynamically Programmable Cellular Architecture and its VLSI Implementation," University of Edinburgh (Dissertation) 1988, pp. 1-286.
Kean, T., et al., "A Fast Constant Coefficient Multiplier for the XC6200," Xilinx, Inc., Lecture Notes in Computer Science, vol. 1142, Proceedings of the 6th International Workshop of Field-Programmable Logic, 1996, 7 pages.
Kim et al., "A Reconfigurable Multifunction Computing Cache Architecture," IEEE Transactions on Very Large Scale Integration (VLSI) Systems vol. 9, Issue 4, Aug. 2001 pp. 509-523.
Knittel, Gunter, "A PCI-compatible FPGA-Coprocessor for 2D/3D Image Processing," University of Turgingen, Germany, 1996 IEEE, pp. 136-145.
Koch, Andreas et al., "High-Level-Language Compilation for Reconfigurable Computers," Proceedings of European Workshop on Reconfigurable Communication-Centric SOCS (Jun. 2005) 8 pages.
Lange, H. et al., "Memory access schemes for configurable processors," Field-Programmable Logic and Applications, International Workshop, FPL, Aug. 27, 2000, pp. 615-625, XP02283963.

Larsen, S., et al., "Increasing and Detecting Memory Address Congruence," Proceedings of the 2002 IEEE International Conference on Parallel Architectures and Compilation Techniques (PACT02), pp. 1-12 (Sep. 2002).

Lee et al., "A new distribution network based on controlled switching elements and its applications," IEEE/ACT Trans. of Networking, vol. 3, No. 1, pp. 70-81, Feb. 1995.

Lee, Ming-Hau et al., "Designs and Implementation of the MorphoSys Reconfigurable Computing Processors," The Journal of VLSI Signal Processing, Kluwer Academic Publishers, BO, vol. 24, No. 2-3, Mar. 2, 2000, pp. 1-29.

Margolus, N., "An FPGA architecture for DRAM-based systolic computations," Boston University Center for Computational Science and MIT Artificial Intelligence Laboratory, IEEE 1997 pp. 2-11.

Mei, Bingfeng, "A Coarse-Grained Reconfigurable Architecture Template and Its Compilation Techniques," Katholeike Universiteit Leuven, PhD Thesis, Jan. 2005, IMEC vzw, Universitair Micro-Electronica Centrum, Belgium, pp. 1-195 (and Table of Contents).

Mei, Bingfeng et al., "Design and Optimization of Dynamically Reconfigurable Embedded Systems," IMEC vzw, 2003, Belgium, 7 pages, http://www.imec.be/reconfigurable/pdf/ICERSA_01_design.pdf.

Miyamori, T., et al., "REMARC: Reconfigurable Multimedia Array Coprocessor," Computer Systems Laboratory, Stanford University, IEICE Transactions on Information and Systems E Series D, 1999; (abstract): Proceedings of the 1998 ACM/SIGDA sixth international symposium on Field programmable gate arrays, p. 261, Feb. 22-25, 1998, Monterey, California, United States, pp. 1-12.

Muchnick, S., "Advanced Compiler Design and Implementation," (Morgan Kaufmann 1997), Table of Contents, 11 pages.

Murphy, C., "Virtual Hardware Using Dynamic Reconfigurable Field Programmable Gate Arrays," Engineering Development Centre, Liverpool John Moores University, UK, GERI Annual Research Symposium 2005, 8 pages.

Nageldinger, U., "Design-Space Exploration for Coarse Grained Reconfigurable Architectures," (Dissertation) Universitaet Kaiserslautern, 2000, Chapter 2, pp. 19-45.

Olukotun, K., "The Case for a Single-Chip Microprocessor," ACM Sigplan Notices, ACM, Association for Computing Machinery, New York, vol. 31, No. 9, Sep. 1996 pp. 2-11.

PACT Corporation, "The XPP Communication System," Technical Report 15 (2000), pp. 1-16.

Parhami, B., "Parallel Counters for Signed Binary Signals," Signals, Systems and Computers, 1989, Twenty-Third Asilomar Conference, vol. 1, pp. 513-516.

Quenot, G.M., et al., "A Reconfigurable Compute Engine for Real-Time Vision Automata Prototyping," Laboratoire Systeme de Perception, DGA/Etablissement Technique Central de l'Armement, France, 1994 IEEE, pp. 91-100.

Ryo, A., "Auszug aus Handbuch der Informationsverarbeitung," ed. Information Processing Society of Japan, *Information Processing Handbook, New Edition*, Software Information Center, Ohmsha, Dec. 1998, 4 pages [Translation provided].

Saleeba, Z.M.G., "A Self-Reconfiguring Computer System," Department of Computer Science, Monash University (Dissertation) 1998, pp. 1-306.

Schmidt, U. et al., "Datawave: A Single-Chip Multiprocessor for Video Applications," *IEEE Micro*, vol. 11, No. 3, May/Jun. 1991, pp. 22-25, 88-94.

Singh, H. et al., "MorphoSys: An Integrated Reconfigurable System for Data-Parallel Computation-Intensive Applications," University of California, Irvine, CA. and Federal University of Rio de Janeiro, Brazil, 2000, IEEE Transactions on Computers, pp. 1-35.

Soni, M., "VLSI Implementation of a Wormhole Run-time Reconfigurable Processor," Jun. 2001, (Masters Thesis)Virginia Polytechnic Institute and State University, 88 pages.

Tsutsui, A., et al., "YARDS: FPGA/MPU Hybrid Architecture for Telecommunication Data Processing," NTT Optical Network Systems Laboratories, Japan, 1997 ACM, pp. 93-99.

Vasell et al., "The Function Processor: A Data-Driven Processor Array for Irregular Computations," Chalmers University of Technology, Sweden, 1992, pp. 1-21.

Waingold, E., et al., "Baring it all to software: Raw machines," IEEE Computer, Sep. 1997, at 86-93.

Weinhardt, Markus et al., "Memory Access Optimization for Reconfigurable Systems," IEEE Proceedings Computers and Digital Techniques, 48(3) (May 2001) pp. 1-16.

Wolfe, M. et al., "High Performance Compilers for Parallel Computing," (Addison-Wesley 1996) Table of Contents, 11 pages.

XILINX, "Spartan and SpartanXL Families Field Programmable Gate Arrays," Jan. 1999, Xilinx, pp. 4-3 through 4-70.

XILINX, "XC6200 Field Programmable Gate Arrays," Apr. 24, 1997, Xilinx product description, pp. 1-73.

XILINX, "XC3000 Series Field Programmable Gate Arrays," Nov. 6, 1998, Xilinx product description, pp. 1-76.

XILINX, "XC4000E and XC4000X Series Field Programmable Gate Arrays," May 14, 1999, Xilinx product description, pp. 1-68.

XILINX, "Virtex-E 1.8 V Extended Memory Field Programmable Gate Arrays," Jul. 17, 2002, Xilinx Production Product Specification, pp. 1-118.

Zhang, et al., "A 1-V Heterogeneous Reconfigurable DSP IC for Wireless Baseband Digital Signal Processing," IEEE Journal of Solid-State Circuits, vol. 35, No. 11, Nov. 2000, pp. 1697-1704.

Zima, H. et al., "Supercompilers for parallel and vector couters," (Addison-Wesley 1991) Table of Contents, 5 pages.

Altera, "2. TriMatrix Embedded Memory Blocks in Stratix & Stratix GX Devices," Altera Corporation, Jul. 2005, 28 pages.

Altera, "APEX II Programmable Logic Device Family," Altera Corporation Data Sheet, Aug. 2002, Ver. 3.0, 99 pages.

Ballagh et al., "Java Debug Hardware Models Using JBits," $8^{th}$ Reconfigurable Architectures Workshop, 2001, 8 pages.

Becker, J., "A Partitioning Compiler for Computers with Xputer-based Accelerators," 1997, Kaiserslautern University, 326 pp.

Bellows et al., "Designing Run-Time Reconfigurable Systems with JHDL," Journal of VLSI Signal Processing 28, Kluwer Academic Publishers, The Netherlands, 2001, pp. 29-45.

"BlueGene/L—Hardware Architecture Overview," BlueGene/L design team, IBM Research, Oct. 17, 2003 slide presentation, pp. 1-23.

"BlueGene/L: the next generation of scalable supercomputer," Kissel et al., Lawrence Livermore National Laboratory, Livermore, California, Nov. 18, 2002, 29 pages.

BlueGene Project Update, Jan. 2002, IBM slide presentation, 20 pages.

U.S. Appl. No. 90/010,979, filed May 4, 2010, Vorbach et al.
U.S. Appl. No. 90/011,087, filed Jul. 8, 2010, Vorbach et al.
U.S. Appl. No. 90/010,450, filed Mar. 27, 2009, Vorbach et al.

BlueGene/L, "An Overview of the BlueGene/L Supercomputer," The BlueGene/L Team, IBM and Lawrence Livermore National Laboratory, 2002 IEEE. pp. 1-22.

Galanis, M.D. et al., "Accelerating Applications by Mapping Critical Kernels on Coarse-Grain Reconfigurable Hardware in Hybrid Systems," Proceedings of the $13^{th}$ Annual IEEE Symposium on Field-Programmable Custom Computing Machines, 2005, 2 pages.

Guccione et al., "JBits: Java based interface for reconfigurable computing," Xilinx, Inc., San Jose, CA, 1999, 9 pages.

Guo, Z. et al., "A CompilerIntermediate Representation for Reconfigurable Fabrics," University of California, Riverside, Dept. of Electrical Engineering, IEEE 2006, 4 pages.

Gwennap, Linley, "P6 Underscores Intel's Lead," Microprocessor Report, vol. 9., No. 2, Feb. 16, 1995 (MicroDesign Resources), p. 1 and pp. 6-15.

Gwennap, Linley, "Intel's P6 Bus Designed for Multiprocessing," Microprocessor Report, vol. 9,No. 7 (MicroDesign Resources), May 30, 1995, p. 1 and pp. 6-10.

Hartenstein et al., "Parallelizing Compilation for a Novel Data-Parallel Architecture," 1995, PCAT-94, Parallel Computing: Technology and Practice, 13 pp.

Hartenstein et al., "A Two-Level Co-Design Framework for Xputer-based Data-driven Reconfigurable Accelerators," 1997, Proceedings of the Thirtieth Annual Hawaii International Conference on System Scietres, 10 pp.

Hauser, John Reid, (Dissertation) "Augmenting A Microprocessor with Reconfigurable Hardware," University of California, Berkeley, Fall 2000, 255 pages. (submitted in 3 PDFs, Parts 1-3).

Hauser, John R., "The Garp Architecture," University of California at Berkeley, Computer Science Division, Oct. 1997, pp. 1-55.

Intel, "Pentium Pro Family Developer's Manual, vol. 3: Operating System Writer's Guide," Intel Corporation, Dec. 1995, [submitted in 4 PDF files: Part I, Part II, Part III and Part IV], 458 pages.

Price et al., "Debug ofReconfigurable Systems," Xilinx, Inc., San Jose, CA, Proceedings of SPIE, 2000, pp. 181-187.

Sundararajan et al., "Testing FPGA Devices Using JBits," Proc. MAPLD 2001, Maryland, USA, Katz (ed.), NASA, CA, 8 pages.

Venkatachalam et al., "A highly flexible, distributed multiprocessor architecture for network processing," Computer Networks, The International Journal of Computer and Telecommunications Networking, vol. 41, No. 5, Apr. 5, 2003, pp. 563-568.

XILINX, "Virtex-II and Virtex-II Pro X FPGA User Guide," Mar. 28, 2007, Xilinx user guide, pp. 1-559.

Xilinx, Inc.'s and Avnet, Inc.'s Disclosure Pursuant to P.R. 4-2; *PACT XPP Technologies, AG.* V. *Xilinx, Inc. and Avnet, Inc.*, Case No. 2:07-cv-00563-TJW-CE, U.S. District Court for the Eastern District of Texas, Dec. 28, 2007, 4 pages.

Xilinx, Inc.'s and Avnet, Inc.'s Disclosure Pursuant to P.R. 4-1; *PACT XPP Technologies, AG.* V. *Xilinx, Inc. and Avnet, Inc.*, Case No. 2:07-cv-00563-TJW-CE, U.S. District Court for the Eastern District of Texas, Dec. 28, 2007, 9 pages.

Defendant's Claim Construction Chart for P.R. 4-2 Constructions and Extrinsic Evidence for Terms Proposed by Defendants, *PACT XPP Technologies, AG.* V. *Xilinx, Inc. and Avnet, Inc.*, Case No. 2:07-cv-00563-TJW-CE, U.S. District Court for the Eastern District of Texas, Dec. 28, 2007, pp. 1-19.

PACT's P.R. 4-1 List of Claim Terms for Construction, *PACT XPP Technologies, AG.* V. *Xilinx, Inc. and Avnet, Inc.*, Case No. 2:07-cv-00563-TJW-CE, U.S. District Court for the Eastern District of Texas, Dec. 28, 2007, pp. 1-7.

PACT's P.R. 4-2 Preliminary Claim Constructions and Extrinsic Evidence, *PACT XPP Technologies, AG.* V. *Xilinx, Inc. and Avnet, Inc.*, Case No. 2:07-cv-00563-TJW-CE, U.S. District Court for the Eastern District of Texas, Dec. 28, 2007, pp. 1-16, and Exhibits re Extrinsic Evidence Parts in seven (7) separate additional PDF files (Parts 1-7).

Culler, D.E; Singh, J.P., "Parallel Computer Architecture," p. 17, 1999, Morgan Kaufmann, San Francisco, CA USA, XP002477559.

Short, Kenneth L., *Microprocessors and Programmed Logic*, Prentice Hall, Inc., New Jersey 1981, p. 34.

Webster's Ninth New Collegiate Dictionary, Merriam-Webster, Inc., 1990, p. 332 (definition of "dedicated").

Li, Zhiyuan, et al., "Configuration prefetching techniques for partial reconfigurable coprocessor with relocation and defragmentation," International Symposium on Field Programmable Gate Arrays, Feb. 1, 2002, pp. 187-195.

ARM Limited, "ARM Architecture Reference Manual," Dec. 6, 2000, pp. A10-6-A10-7.

Altera, "Implementing High-Speed Search Applications with Altera CAM," Jul. 2001, Ver. 2.1, Application Note 119, 50 pages.

Bolsens, Ivo (CTO Xilinx), "FPGA, a history of interconnect," Xilinx slide presentation, posted on the internet Oct. 30, 2008 at http://www.docstoc.com/docs/2198008/FPGA-a-history-of-interconnect, 32 pages.

Microsoft Press Computer Dictionary, Third Edition, Redmond, WA, 1997, 3 pages.

Microsoft Press Computer Dictionary, Second Edition, Redmond, WA, 1994, 3 pages.

A Dictionary of Computing, Fourth Edition, Oxford University Press, 1997, 4 pages.

Communications Standard Dictionary, Third Edition, Martin Weik (Ed.), Chapman & Hall, 1996, 3 pages.

Dictionary of Communications Technology, Terms Definitions and Abbreviations, Second Edition, Gilbert Held (Ed.), John Wiley & Sons, England, 1995, 5 pages.

The Random House College Dictionary, Revised Edition, Random House, Inc., 1984, 14 pages.

The Random House College Dictionary, Revised Edition, Random House, Inc., 1984, 7 pages.

Random House Webster's College Dictionary with CD-ROM, Random House, 2001, 7 pages.

Random House Webster's College Dictionary with CD-ROM, Random House, 2001, 4 pages.

Random House Personal Computer Dictionary, Second Edition, Philip E. Margolis (Ed.), Random House, New York, 1996, 5 pages.

The IEEE Standard Dictionary of Electrical and Electronics Terms, Sixth Edition, 1996, 36 pages.

The IEEE Standard Dictionary of Electrical and Electronics Terms, Sixth Edition, 1996, 8 pages.

McGraw-Hill Electronics Dictionary, Sixth Edition, Neil Sclater et al. (Ed.), McGraw-Hill, 1997, 3 pages.

Modern Dictionary of Electronics, Sixth Edition, Rudolf Graf (Ed.), Newnes (Butterwoth-Heinemann), 1997, 5 pages.

The American Heritage Dictionary, Fourth Edition, Dell (Houghton-Mifflin), 2001, 5 pages.

The American Heritage Dictionary, Second College Edition, Houghton Mifflin, 1982, 23 pages.

The American Heritage Dictionary, Second College Edition, Houghton Mifflin, 1982, 8 pages.

The American Heritage Dictionary, Third Edition, Dell Publishing (Bantam Doubleday Dell Publishing Group, Inc.), 1994, 4 pages.

The American Heritage Dictionary, Fourth Edition, Dell/Houghton Mifflin 2001, 5 pages.

Webster's New Collegiate Dictionary, Merriam Co., 1981, 5 pages.

Webster's New Collegiate Dictionary, Merriam Co., 1981, 4 pages.

The Oxford American Dictionary and Language Guide, Oxford University Press, 1999, 5 pages.

The Oxford Duden German Dictionary, Edited by the Dudenredaktion and the German Section of the Oxford University Press, W. Scholze-Stubenrecht et al. (Eds), Clarendon Press, Oxford, 1990, 7 pages.

Oxford Dictionary of Computing, Oxford University Press, 2008, 4 pages.

Modern Dictionary of Electronics, Sixth Edition Revised and Updated, Rudolf F. Graf (Ed.), Butterworth-Heinemann, 1997, 7 pages.

Modern Dictionary of Electronics, Sixth Edition Revised and Updated, Rudolf F. Graf (Ed.), Butterworth-Heinemann, 1997, 5 pages.

Garner's Modern American Usage, Bryan A. Garner (Ed.), Oxford University Press, 2003, 3 pages.

The New Fowler's Modern English Usage, R.W. Burchfield (Ed.), Oxford University Press, 2000, 3 pages.

Wikipedia, the free encyclopedia, "Granularity," at http://en.wikinedia.ore/wiki/Granularity, Jun. 18, 2010, 4 pages.

Wordsmyth, The Premier Educational Dictionary—Thesaurus, at http://www.wordsmyth.net, "communication", Jun. 18, 2010, 1 page.

Yahoo! Education, "affect," at http://education.yahoo.com/reference/dictionary/entry/affect, Jun. 18, 2010, 2 pages.

mPulse Living Language, "high-level," at http://www.macmillandictionary.com/dictionary/american/high-level, Jun. 18, 2010, 1 page.

MSN Encarta, "regroup," at http://encarta.msn.com/encnet/features/dictionary/DictionaryResults.aspx?lextype=3&search=regroup, Jun. 17, 2010, 2 pages.

MSN Encarta, "synchronize," at http://encarta.msn.com/encnet/features/dictionary/DictionaryResults.aspx?lextype=3 &search=synchronize, Jun. 17, 2010, 2 pages.

MSN Encarta, "pattern," at http://encarta.msn.com/encnet/features/dictionarv/DictionaryResults.aspx?lextype=3&search-pattern, Jun. 17, 2010, 2 pages.

MSN Encarta, "dimension," at http://encarta.msn.com/encnet/features/dictionary/DictionaryResults.aspx?lextype=3 &search=dimension Jun. 17, 2010, 2 pages.

MSN Encarta, "communication," at http://encarta.msn.com/encnet/features/dictionary/DictionaryResults.aspx?lextype=3 &search=communication, Jun. 17, 2010, 2 pages.

MSN Encarta, "arrangement," at http://encarta.msn.com/encnet/features/dictionary/DictionaryResults.aspx?lextype=3 &search=arrangement, Jun. 17, 2010, 2 pages.

MSN Encarta, "vector," at http://encarta.msn.com/encnet/features/dictionary/DictionaryResults.aspx?lextype=3&search=vector, Jul. 30, 2010, 2 pages.

Dictionary.com, "address," at http://dictionary.reference.com/browse/address, Jun. 18, 2010, 4 pages.

P.R. 4-3 Joint Claim Constructions Statement, *PACT XPP Technologies, AG v. Xilinx, Inc. and Avnet, Inc et al.*, E.D. Texas, 2:07-cv-00563-CE, Jul. 19, 2010, pp. 1-50.

Order Granting Joint Motion for Leave to File An Amended Joint Claim Construction and Prehearing Statement and Joint Motion to File an Amended Joint Claim Construction and Prehearing Statement Pursuant to Local Patent Rule 4-3, and Exhibit A: P.R. 4-3 Amended Joint Claim Constructions Statement, *PACT XPP Technologies, AG v. Xilinx, Inc. and Avnet, Inc. et al.*, E.D. Texas, 2:07-cv-00563-CE, Aug. 2, 2010, 72 pages.

(43-1) P.R. 4-3 Amended Joint Claim Constructions Statement, *PACT XPP Technologies, AG v. Xilinx, Inc. and Avnet, Inc. et al.*, E.D. Texas, 2:07-cv-00563-CE, Aug. 3, 2010, pp. 1-65.

Exhibit A—P.R. 4-3 Amended Joint Claim Constructions Statement, *PACT XPP Technologies, AG v. Xilinx, Inc. and Avnet, Inc. et al.*, E.D. Texas, 2:07-cv-00563-CE, Aug. 2, 2010, pp. 1-66.

PACT's Opening Claim Construction Brief *PACT XPP Technologies, AG v. Xilinx, Inc. and Avnet, Inc.*, E.D. Texas, 2:07-cv-00563-CE, Nov. 1, 2010, pp. 1-55.

Declaration of Harry L. (Nick) Tredennick in Support of PACT's Claim Constructions, *PACT XPP Technologies, AG v. Xilinx, Inc. and Avnet, Inc. et al.*, E.D. Texas, 2:07-cv-00563-CE, Nov. 1, 2010, pp. 1-87.

Transcript of Harry (Nick) L. Tredennick III, Ph.D., Oct. 11, 2010, vol. 1, Exhibit 16 of PACT's Opening Claim Construction Brief, *PACT XPP Technologies, AG v. Xilinx, Inc. and Avnet, Inc. et al.*, E.D. Texas, 2:07-cv-00563-CE, Nov. 1, 2010, pp. 1-3.

Agreed and Disputed Terms, Exhibit 17 of PACT's Opening Claim Construction Brief, *PACT XPP Technologies, AG v. Xilinx, Inc. and Avnet, Inc. et al.*, E.D. Texas, 2:07-cv-00563-CeE Nov. 1, 2010, pp. 1-16.

Oral Videotaped Deposition—Joseph McAlexander dated Oct. 12, 2010, vol. 1, Exhibit 18 of PACT's Opening Claim Construction Brief, *PACT XPP Technologies, AG v. Xilinx, Inc. and Avnet, Inc. et al.*, E.D. Texas, 2:07-cv-00563-CE, Nov. 1, 2010, pp. 1-17.

Expert Report of Joe McAlexander Re Claim Construction dated Sep. 27, 2010, Exhibit 19 of PACT's Opening Claim Construction Brief; *PACT XPP Technologies, AG v. Xilinx, Inc. and Avnet, Inc. et al.*, E.D. Texas, 2:07-cv-00563-CE, Nov. 1, 2010, pp. 1-112.

Documents from File History of U.S. Appl. No. 09/290,342, filed Apr. 12, 1999, Exhibit 20 of PACT's Opening Claim Construction Brief, *PACT XPP Technologies, AG v. Xilinx, Inc. and Avnet, Inc. et al.*, E.D. Texas, 2:07-cv-00563-CE, Nov. 1, 2010, pp. 1-37.

Amendment from File History of U.S. Appl. No. 10/156,397, filed May 28, 2002, Exhibit 25 of PACT's Opening Claim Construction Brief, *PACT XPP Technologies, AG v. Xilinx, Inc. and Avnet, Inc. et al.*, E.D. Texas, 2:07-cv-00563-CE, Nov. 1, 2010, pp. 1-12.

Documents from File History U.S. Appl. No. 09/329,132, filed Jun. 9, 1999, Exhibit 27 of PACT's Opening Claim Construction Brief, *PACT XPP Technologies, AG v. Xilinx, Inc. and Avnet, Inc. et al.*, E.D. Texas, 2:07-cv-00563-CE, Nov. 1, 2010, pp. 1-36.

Amendment from File History of U.S. Appl. No. 10/791,501, filed Mar. 1, 2004, Exhibit 39 of PACT's Opening Claim Construction Brief, *PACT XPP Technologies, AG v. Xilinx, Inc. and Avnet, Inc. et al.*, E.D. Texas, 2:07-cv-00563-CE, Nov. 1, 2010, pp. 1-9.

Amendment from File History of U.S. Appl. No. 10/265,846, filed Oct. 7, 2002, Exhibit 40 of PACT's Opening Claim Construction Brief, *PACT XPP Technologies, AG v. Xilinx, Inc. and Avnet, Inc. et al.*, E.D. Texas, 2:07-cv-00563-CE, Nov. 1, 2010, pp. 1-12.

Defendants Xilinx, Inc. and Avnet, Inc.'s Responsive Claim Construction Brief, *PACT XPP Technologies, AG v. Xilinx, Inc. and Avnet, Inc. et al.*, E.D. Texas, 2:07-cv-00563-CE, Dec. 6, 2010, pp. 1-55.

Declaration of Aaron Taggart in Support of Defendants Xilinx, Inc. and Avnet, Inc.'s Responsive Claim Construction Brief, Defendants Xilinx, Inc. and Avnet, Inc.'s Responsive Claim Construction Brief (Exhibit A), *PACT XPP Technologies, AG v. Xilinx, Inc. and Avnet, Inc. et al.*, E.D. Texas, 2:07-cv-00563-CE, Dec. 6, 2010, pp. 1-5.

Oral Videotaped Deposition Joseph McAlexander (Oct. 12, 2010), Exhibit 1 of Defendants Xilinx, Inc. and Avnet, Inc.'s Responsive Claim Construction Brief, *PACT XPP Technologies, AG v. Xilinx, Inc. and Avnet, Inc. et al.*, E.D. Texas, 2:07-cv-00563-CE, Dec. 6, 2010, pp. 1-9.

Expert Report of Joe McAlexander re Claim Construction, Exhibit 2 of Defendants Xilinx, Inc. and Avnet, Inc.'s Responsive Claim Construction Brief, *PACT XPP Technologies, AG v. Xilinx, Inc. and Avnet, Inc. et al.*, E.D. Texas, 2:07-cv-00563-CE, Dec. 6, 2010, pp. 1-137.

Various Documents from File History of U.S. Appl. No. 09/290,342, filed Apr. 12, 1999, Exhibit 6 of Defendants Xilinx, Inc. and Avnet, Inc.'s Responsive Claim Construction Brief, *PACT XPP Technologies, AG v. Xilinx, Inc. and Avnet, Inc. et al.*, E.D. Texas, 2:07-cv-00563-CE, Dec. 6, 2010, pp. 1-181.

Transcript of Harry (Nick) L. Tredennick III, Ph.D., Oct. 11, 2010, vol. 1, Exhibit 7 of Defendants Xilinx, Inc. and Avnet, Inc.'s Responsive Claim Construction Brief, *PACT XPP Technologies, AG v. Xilinx, Inc. and Avnet, Inc. et al.*, E.D. Texas, 2:07-cv-00563-CE, Dec. 6, 2010, pp. 1-28.

Amendment, Response from File History of U.S. Appl. No. 10/156,397, filed May 28, 2002, Exhibit 15 of Defendants Xilinx, Inc. and Avnet, Inc.'s Responsive Claim Construction Brief, *PACT XPP Technologies, AG v. Xilinx, Inc. and Avnet, Inc. et al.*, E.D. Texas, 2:07-cv-00563-CE, Dec. 6, 2010, pp. 1-137.

Application from File History of U.S. Appl. No. 08/544,435, filed Nov. 17, 1995, Exhibit 20 of Defendants Xilinx, Inc. and Avnet, Inc.'s Responsive Claim Construction Brief, *PACT XPP Technologies, AG v. Xilinx, Inc. and Avnet, Inc. et al.*, E.D. Texas, 2:07-cv-00563-CE, Dec. 6, 2010, pp. 1-102.

Documents from File History of U.S. Appl. No. 09/329,132, filed Jun. 9, 1999, Exhibit 24 of Defendants Xilinx, Inc. and Avnet, Inc.'s Responsive Claim Construction Brief, *PACT XPP Technologies, AG v. Xilinx, Inc. and Avnet, Inc. et al.*, E.D. Texas, 2:07-cv-00563-CE, Dec. 6, 2010, pp. 1-13.

Documents from File History of U.S. Appl. No. 10/791,501, filed Mar. 1, 2004, Exhibit 25 of Defendants Xilinx, Inc. and Avnet, Inc.'s Responsive Claim Construction Brief, *PACT XPP Technologies, AG v. Xilinx, Inc. and Avnet, Inc. et al.*, E.D. Texas, 2:07-cv-00563-CE, Dec. 6, 2010, pp. 1-14.

Amendment from File History of U.S. Appl. No. 11/246,617, filed Oct. 7, 2005, Exhibit 26 of Defendants Xilinx, Inc. and Avnet, Inc.'s Responsive Claim Construction Brief, *PACT XPP Technologies, AG v. Xilinx, Inc. and Avnet, Inc. et al.*, E.D. Texas, 2:07-cv-00563-CE, Dec. 6, 2010, pp. 1-9.

Documents from File History of U.S. Appl. No. 08/947,254, filed Oct. 8, 1997, Exhibit 27 of Defendants Xilinx, Inc. and Avnet, Inc.'s Responsive Claim Construction Brief, *PACT XPP Technologies, AG v. Xilinx, Inc. and Avnet, Inc. et al.*, E.D. Texas, 2:07-cv-00563-CE, Dec. 6, 2010, pp. 1-38.

Documents from File History of U.S. Appl. No. 08/947,254, filed Oct. 8, 1997, specifically, German priority application specification [English translation provided], Exhibit 33 of Defendants Xilinx, Inc. and Avnet, Inc.'s Responsive Claim Construction Brief, *PACT XPP Technologies, AG v. Xilinx, Inc. and Avnet, Inc. et al.*, E.D. Texas, 2:07-cv-00563-CE, Dec. 6, 2010, 54 pages [including English translation].

Documents from File History of U.S. Appl. No. 09/335,974, filed Jun. 18, 1999, Exhibit 28 of Defendants Xilinx, Inc. and Avnet, Inc.'s Responsive Claim Construction Brief, *PACT XPP Technologies, AG v. Xilinx, Inc. and Avnet, Inc. et al.*, E.D. Texas, 2:07-cv-00563-CE, Dec. 6, 2010, pp. 1-32.

Documents from File History of U.S. Appl. No. 90/010,450, filed Mar. 27, 2009, Exhibit 30 of Defendants Xilinx, Inc. and Avnet, Inc.'s Responsive Claim Construction Brief, *PACT XPP Technologies, AG v. Xilinx, Inc. and Avnet, Inc. et al.*, E.D. Texas, 2:07-cv-00563-CE, Dec. 6, 2010, pp. 1-71.

Documents from File History of U.S. Appl. No. 10/265,846, filed Oct. 7, 2002, Exhibit 32 of Defendants Xilinx, Inc. and Avnet, Inc.'s Responsive Claim Construction Brief, *PACT XPP Technologies, AG v. Xilinx, Inc. and Avnet, Inc. et al.*, E.D. Texas, 2:07-cv-00563-CE, Dec. 6, 2010, pp. 1-23.

PACT's Claim Construction Reply Brief, *PACT XPP Technologies, AG v. Xilinx, Inc. and Avnet, Inc. et al.*, E.D. Texas, 2:07-cv-00563-CE, Jan. 7, 2011, pp. 1-20.

Defendants Xilinx, Inc. and Avnet, Inc.'s Claim Construction Sur-reply Brief, *PACT XPP Technologies, AG v. Xilinx, Inc. and Avnet, Inc. et al.*, E.D. Texas, 2:07-cv-00563-CE, Jan. 18, 2011, 142 pages.
Markman Hearing Minutes and Attorney Sign-In Sheet, *PACT XPP Technologies, AG v. Xilinx, Inc. and Avnet, Inc. et al.*, E.D. Texas, 2:07-cv-00563-CE, Feb. 22, 2011, 3 pages; and court transcript, 245 pages.
Memorandum Opinion and Order, *PACT XPP Technologies, AG v. Xilinx, Inc. and Avnet, Inc. et al.*, E.D. Texas, 2:07-cv-00563-CE, Jun. 17, 2011, pp. 1-71.
Atmel Corporation, Atmel 5-K-50K Gates Coprocessor FPGA and FreeRAM, (www.atmel.com), Apr. 2002, pp. 1-68.
Glaskowsky, Peter N., "PACT Debuts Extreme Processor; Reconfigurable ALU Array Is Very Powerful—and Very Complex" Microprocessor, The Insider's Guide to Microprocessor Hardware, MicroDesign Resources—Microprocessor Report, Oct. 9, 2000 (www.MPRonline.com), 6 pages.
Glaskowsky, Peter N., "Analysis' Choice Nominees Named; Our Picks for 2002's Most Important Products and Technologies" Microprocessor, The Insider's Guide to Microprocessor Hardware, MicroDesign Resources—Microprocessor Report, Dec. 9, 2002 (www.MPRonline.com), 4 pages.
Lattice Semiconductor Corporation, ispLSI 2000E, 2000VE and 2000 VL Family Architectural Description, Oct. 2001, pp. 1-88.
Olukotun, K. et al., "Rationale, Design and Performance of the Hydra Multiprocessor," Computer Systems Laboratory, Stanford University, CA, Nov. 1994, pp. 1-19.
PACT Corporate Backgrounder, PACT company release, Oct. 2008, 4 pages.
Page, Ian., "Reconfigurable processor architectures," Oxford University Computing Laboratory, Oxford UK, Elsevier Science B.V., Microprocessors an Microsystems 20 (1996) pp. 185-196.
Singh, Hartej et al., "Morpho-Sys: A Reconfigurable Architecture for Multimedia Applications," Univ. of California, Irvine, CA and Federal University of Rio de Janiero, Brazil, at http://www.eng.uci.edu/morphosys/docs/sbcci98.html, Jun. 18, 2010, 10 pages.
Theodoridis, G. et al., "Chapter 2—A Survey of Coarse-Grain Reconfigurable Architectures and Cad Tools, Basic Definitions, Critical Design Issues and Existing Coarse-grain Reconfigurable Systems," from S. Vassiliadis, and D. Soudris (eds.) *Fine- and Coarse-Grained Reconfigurable Computing*, Springer 2007, pp. 89-149.
Weinhardt, Markus et al., "Using Function Folding to Improve Silicon Efficiency of Reconfigurable Arithmetic Arrays," PACT XPP Technologies AG, Munich, Germany, IEEE 2004, pp. 239-245.
Xilinx, XC6200 Field Programmable Gate Arrays, Advance Product Specification, Jun. 1, 1996 (Version 1.0), pp. 4-255 through 4-286.
Xilinx, Virtex-II Platform FPGA User Guide, UG002 (V2.1) Mar. 28, 2007, pp. 1-502 [Parts 1-3].
Xilinx, XC4000E and SC4000X Serial Field Programmable Gate Arrays, Product Specification (Version 1.6), May 14, 1999, pp. 1-107.
Cherbaka, Mark F., "Verification and Configuration of a Run-time Reconfigurable Custom Computing Integrated Circuit for DSP Applications," Thesis: Virginia Polytechnic Institute and State University, Jul. 8, 1996, 106 pages.
Cong et al., "Structural Gate Decomposition for Depth-Optimal Technology Mapping in LUT-Based FPGA Designs," Univ. of California, ACM Transactions on Design Automation of Electronic Systems, vol. 5, No. 2, Apr. 2000, pp. 193-225.
FOLDOC, The Free On-Line Dictionary of Computing, "handshaking," online Jan. 13, 1995, retrieved from Internet Jan. 23, 2011 at http://foldoc.org/handshake.
Li et al., "Hardware-Software Co-Design of Embedded Reconfigurable Architectures," Los Angeles, CA, 2000, ACM, pp. 507-512.
Marshall et al., "A Reconfigurable Arithmetic Array for Multimedia Applications," FPGA '99 Proceedings of the 1999 ACM/SIGDA Seventh International Symposium on Field Programmable Gate Arrays, 10 pages.
Melvin, Stephen et al., "Hardware Support for Large Atomic Units in Dynamically Scheduled Machines," Computer Science Division, University of California, Berkeley, IEEE (1988), pp. 60-63.
Pistorius et al., "Generation of Very Large Circuits to Benchmark the Partitioning of FPGAs," Monterey, CA, 1999, ACM, pp. 67-73.
Roterberg, Eric et al., "Trace Cache: a Low Latency Approach to High Bandwidth Instruction Fetching," Proceedings of the $29^{th}$ Annual International Symposium on Michoarchitecture, Paris, France, IEEE (1996), 12 pages.
Ramanathan et al., "Reconfigurable Filter Coprocessor Architecture for DSP Applications," Journal of VLSI Signal Processing, 2000, vol. 26, pp. 333-359.
Shanley, Tom, *Pentium Pro and Pentium II System Architecture*, MindShare, Inc., Addition Wesley, 1998, Second Edition, pp. 11-17; Chapter 7; Chapter 10; pp. 209-211, and p. 394.
Shoup, Richard, "Programmable Cellular Logic Arrays," Dissertation, Computer Science Department, Carnegie-Mellon University, Mar. 1970, 193 pages.
Zucker, Daniel F., "A Comparison of Hardware Prefetching Techniques for Multimedia Benchmarks," Technical Report: CSL-TR-95-683, Dec. 1995, 26 pages.
Coelho, F., "Compiling dynamic mappings with array copies," Jul. 1997, 12 pages, http://delivery.acm.org/10.1145/270000/263786/p168-coelho.pdf.
Janssen et al., "A Specification Invariant Technique for Regularity Improvement between Flow-Graph Clusters," Mar. 1996, 6 pages, http://delivery.acm.org/10.1145/790000/787534/74230138.pdf.
Microsoft Press Computer Dictionary, Second Edition, 1994, Microsoft Press, ISBN 1-55615-597-2, p. 10.
Newton, Harry, "Newton's Telecom Dictionary," Ninteenth Edition, 2003, CMP Books, p. 40.
Rehmouni et al., "Formulation and evaluation of scheduling techniques for control flow graphs," Dec. 1995, 6 pages, http://delivery.acm.org/10.1145/230000/224352/p386-rahmouni.pdf.
Sinha et al., "System-dependence-graph-based slicing of programs with arbitrary interprocedural control flow," May 1999, 10 pages, http://delivery.acm.org/10.1145/310000/203675/p432-sinha.pdf.
Stallings, William, "Data & Computer Communications," Sixth Edition, Jun. 2000, Prentice-Hall, Inc., ISBN 0-084370-9, pp. 195-196.

\* cited by examiner

Fig. 1a
```
      MOVL #1,R2
      TSTL R1
      BEQL 20$
10$:  MULL2 R2,R0
      DECL R1
      BRB 10$
20$:
```
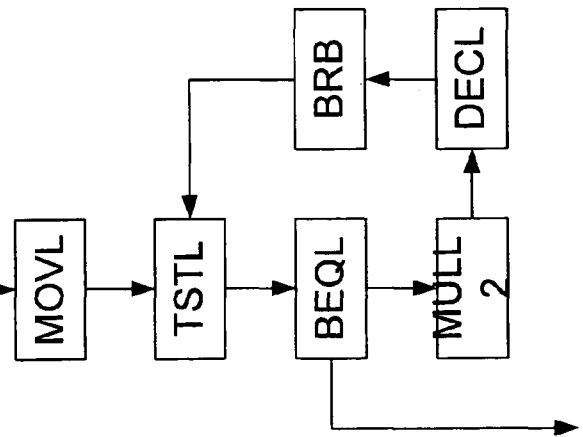
Fig. 1b
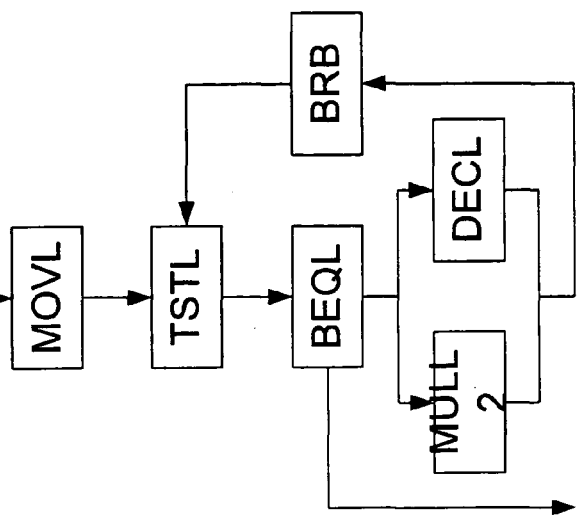
Fig. 1c

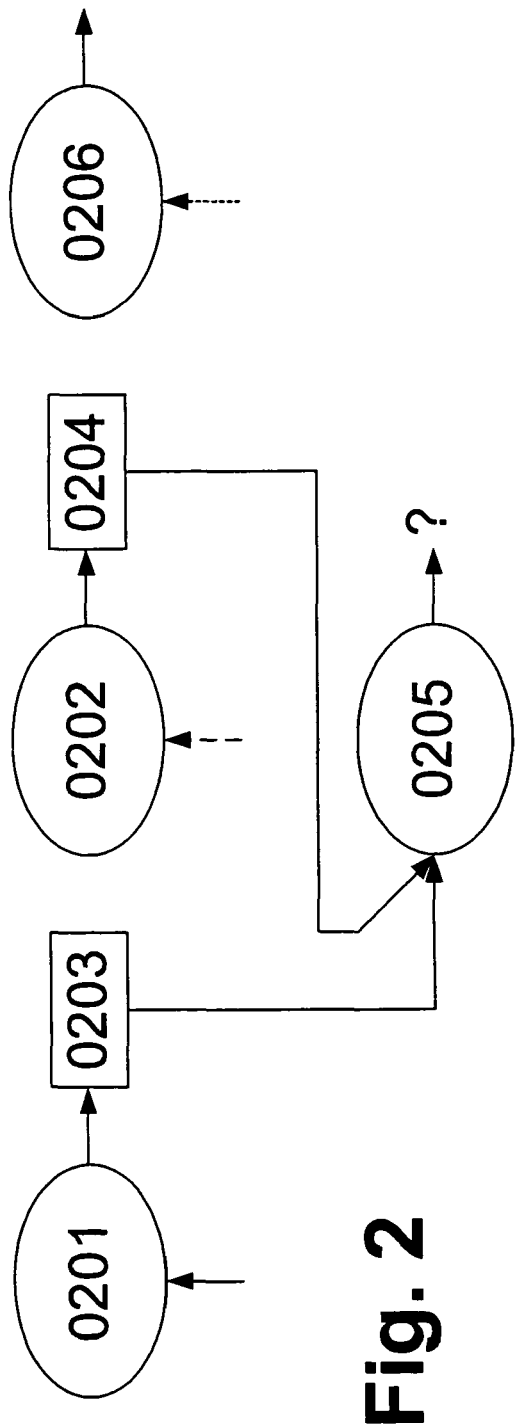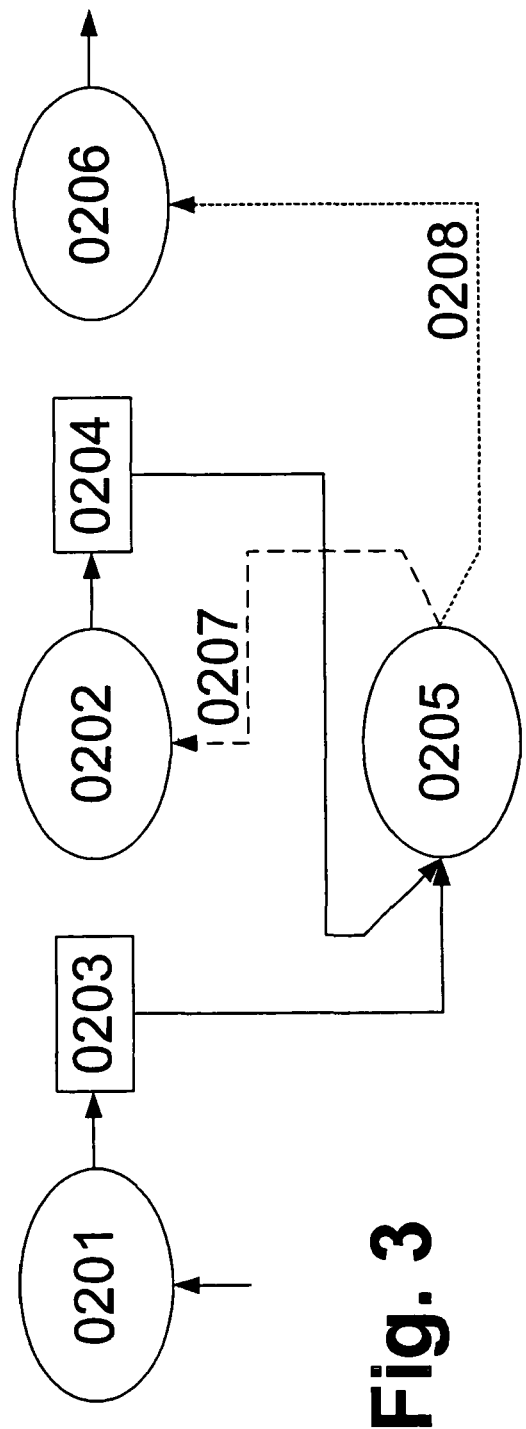
Fig. 2
Fig. 3

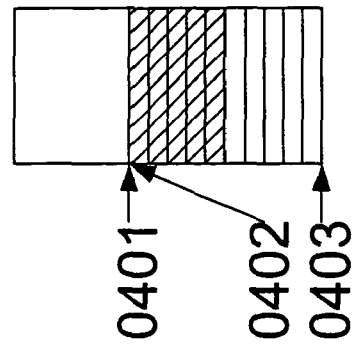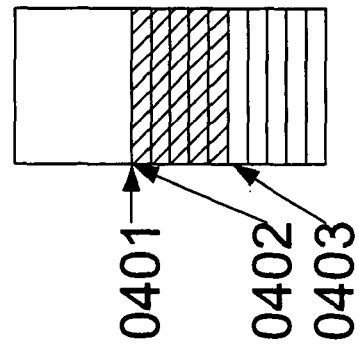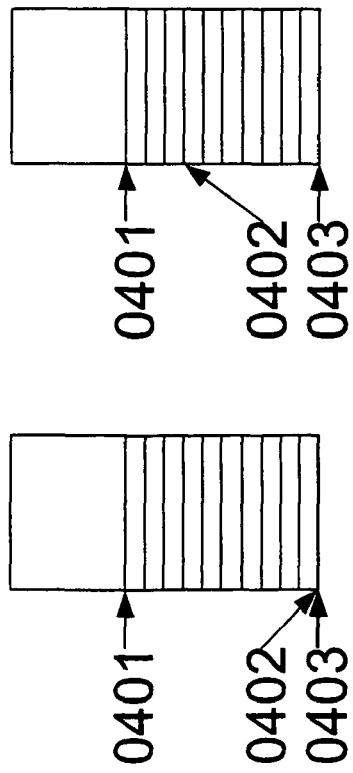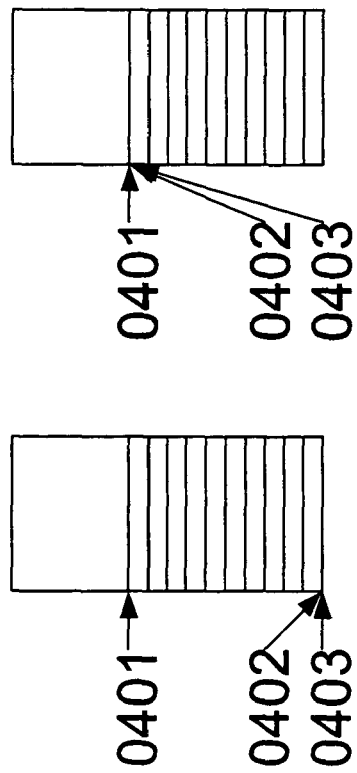

RECONFIGURABLE GENERAL PURPOSE PROCESSOR HAVING TIME RESTRICTED CONFIGURATIONS

FIELD OF THE INVENTION

The present invention relates to reconfigurable multidimensional logic fields and their operation.

BACKGROUND INFORMATION

Reconfigurable elements are designed differently depending on the application to be executed and are designed to be consistent with the application. A reconfigurable architecture is understood in the present case to refer to modules or units (VPUs) having a configurable function and/or interconnection, in particular integrated modules having a plurality of arithmetic and/or logic and/or analog and/or memory and/or internally/externally interconnected modules arranged in one or more dimensions and interconnected directly or via a bus system.

The generic type represented by these modules includes in particular systolic arrays, neural networks, multiprocessor systems, processors having multiple arithmetic units and/or logic cells and/or communicative/peripheral cells (IO), interconnection and network modules, e.g., crossbar switches as well as known modules of the FPGA, DPGA, Chameleon, VPUTER, etc. types. Reference is made in particular in this connection to the following patents and applications by the present applicant: DE 44 16 881 A1, DE 197 81 412 A1, DE 197 81 483 A1, DE 196 54 846 A1, DE 196 54 593 A1, DE 197 04 044.6 A1, DE 198 80 129 A1, DE 198 61 088 A1, DE 199 80 312 A1, PCT/DE 00/01869, DE 100 36 627 A1, DE 100 28 397 A1, DE 101 10 530 A1, DE 101 11 014 A1, PCT/EP 00/10516, EP 01 102 674 A1, DE 198 80 128 A1, DE 101 39 170 A1, DE 198 09 640 A1, DE 199 26 538.0 A1, DE 100 50 442 A1, as well as PCT/EP 02/02398, DE 102 40 000, DE 102 02 044, DE 102 02 175, DE 101 29 237, DE 101 42 904, DE 101 35 210, EP 01 129 923, PCT/EP 02/10084, DE 102 12 622, DE 102 36 271, DE 102 12 621, EP 02 009 868, DE 102 36 272, DE 102 41 812, DE 102 36 269, DE 102 43 322, EP 02 022 692, PACT40. Reference is made to the documents below by using the applicant's internal reference notation. These are herewith incorporated to the full extent for disclosure purposes.

The aforementioned architecture is used as an example for illustration and is referred to below as a VPU. This architecture is composed of any arithmetic or logic cells (including memories) and/or memory cells and/or interconnection cells and/or communicative/peripheral (IO) cells (PAEs) which may be arranged to form a one-dimensional or multidimensional matrix (PA), which may have different cells of any design. Bus systems are also understood to be cells here. The matrix as a whole or parts thereof are assigned a configuration unit (CT, load logic) which configures the interconnection and function of the PA. The CT may be designed as a dedicated unit according to PACT05, PACT10, PACT17, for example, or as a host microprocessor according to P 44 16 881.0-53, DE 101 06 856.9; it may be assigned to the PA and/or implemented with or through such a unit.

SUMMARY

The present invention relates to a processor model for reconfigurable architectures based on the model of a traditional processor in some essential points. For better understanding, the traditional model will be first considered in greater detail. Resources external to the processor (e.g., main memory for programs and data, etc.) are not considered here.

A processor executes a program in a process. The program includes a finite quantity of instructions (this quantity may include multiple instances of elements) as well as information regarding the order in which the instructions may follow one another. This order is determined primarily by the linear arrangement of the instructions in the program memory and the targets of jump instructions.

Instructions are usually identified by their address. As an example, FIG. 1 (a) shows a program written in VAX Assembler for exponentiation.

A program may also be interpreted as oriented graphs, where the instructions form the nodes and their order is modeled as edges of the graph. This graph is shown in FIG. 1 (b). The graph has a definite start node and a definite end node (not shown in the figure; indicated by the arrows). The edges may additionally be marked with transition probabilities. This information may then be used for jump prediction. The jump prediction may in turn be used for preloading configurations into the memory of the CT of a VPU (see patent application PACT10, the full content of which has been included for disclosure purposes) and/or for preloading configurations into the configuration stack of the PAE (according to patent applications PACT13, PACT17, PACT31, the full content of which is included for disclosure purposes). By preloading configurations into the local memory of the CT (see PACT10, 17) and/or into the PAE's local configuration cache (PACT17, 31), the configurations may then be called more rapidly as needed, which yields a great increase in efficiency.

The linear arrangement of the instructions in the memory results in more dependences than absolutely necessary; e.g., in the example shown here, instructions DECL and MULL2 are mutually independent. This is not indicated by the graph in FIG. 1 (b). The model may be expanded accordingly by division nodes and combination nodes, as illustrated in FIG. 1 (c).

Processors today implement such possibilities of parallel execution in hardware to some extent and distribute the operations among various arithmetic logic units. The model from FIG. 1 (b) will be used for further consideration. The discussion of the additional complexity of division and combining will be shifted to a later point in time. A process also needs other resources in addition to the program for its execution. Within the processor, these include the registers and the status flags.

These resources are used to convey information between the individual program instructions. The task of the operating system is to ensure that the resources needed for execution of a process are available to it and are released again when the process is terminated. Processors today usually have only one set of registers, so that only one process may run on the processor at a time. It is possible for the instructions of two different processes to be executable in any order as long as both processes use disjunct resources (e.g., if process 1 is using registers 0-3 and process 2 is using registers 4-7).

Instructions of a processor usually have the following properties:

An instruction is not interrupted during execution.
The execution time for all instructions does not exceed a certain maximum value.
Invalid instructions are recognized by the processor.
An object of the present invention is to provide a novel approach for commercial use.

BRIEF DESCRIPTION OF THE DRAWINGS

FIG. 1a shows a program written in VAX assembler.
FIG. 1b shows the program interpreted as a graph.

FIG. 1c shows an expanded model.

FIG. 2 shows a subprogram in graphic representation.

FIG. 3 shows an inserted subprogram call.

FIG. 4a shows the position of a power at the beginning of a CIW.

FIG. 4b shows how the pointer position of a register may appear at the end of a CIW.

FIG. 5a shows a register before a write access.

FIG. 5b shows that existing data may be deleted in such a was that a write access begins with an empty vector.

FIG. 5c shows the write data may be appended to the existing content.

FIGS. 5d and 5e show the state of the register after successful write operations.

DETAILED DESCRIPTION OF EXAMPLE EMBODIMENTS

Figure 6E:
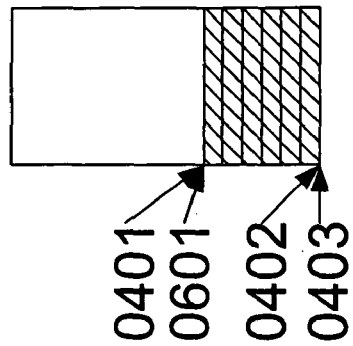
FIGS. 6a-6e show read/write accesses.
Figure 6D:
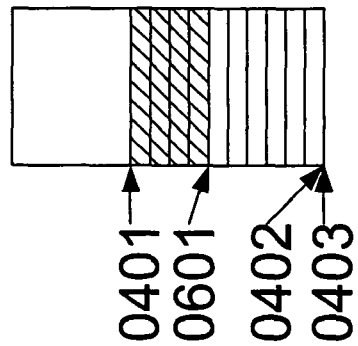
Figure 6C:
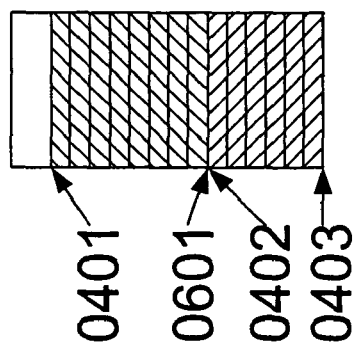
Figure 6B:
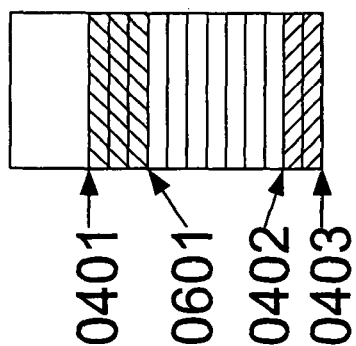
Figure 6A:
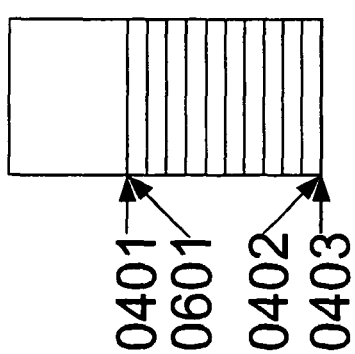

2. Transfer of the Model to the VPU Architecture

An exemplary VPU architecture is a reconfigurable processor architecture as described in, for example, PACT01, 02, 03, 04, 05, 07, 08, 09, 10, 13, 17, 22, 23, 24, 31. As mentioned above, the full content of these documents is herewith incorporated for disclosure purposes. Reference is also made to PACT11, 20 and 27, which describe corresponding high-level language compilers, as well as a PACT21 which describes a corresponding debugger. The full content of these documents is also included here for disclosure purposes.

The traditional instruction is replaced by a configuration in the known sense. For example, the aforementioned DE 101 39 170, which is incorporated herein by reference, describes that, for such configurations, a partitioning may be calculated with the aim to process as many data packets without changing the configured commands. For example, for an algorithm and/or a series of statements, a breakdown of the algorithm and/or series of statements may be chosen so that as many data packets can be processed without changing the configuration. The configuration is referred to in the following discussion as a complex instruction word (CIW). The edges of graphs in FIG. 1 (b) are formed by trigger signals to the CT. It is thus possible to implement a complete program by having the CT and/or the configuration cache of the PAEs load the following CIW after successful processing of one CIW (see PACT31 and/or as described below).

It was recognized first how a correspondence of registers of traditional processors could be implemented on the VPU architecture. It was discovered that an essential prerequisite for register implementation is based on the following:

Since the VPU operates essentially on data streams, a register must be capable of storing a data stream and/or parts thereof.

A register must be capable of being allocated and released. It must remain occupied as long as the program is running on the VPU (HW support of the resource management of the operating system).

Simultaneous reading and writing (read-modify-write) of the same register should be possible.

It is explained how this may be achieved in a processor and the use of suitably modified RAM PAEs is also proposed according to the present invention. These should first be used as registers.

A detailed description of the register PAEs preferably by expanded and/or modified RAM PAEs is given in section 4 below. A configuration (CIW) is removed from the array at the moment when it requests the next CIW from the CT via a trigger. The reconfig trigger (see PACT08) may be generated either via the reconfig port of an ALU PAE or implicitly by the CT. In optimally designed versions, this should fundamentally take place from the CT.

Just as instructions on a traditional processor are not interrupted, a CIW preferably also runs on the VPU without interruption until it requests the next CIW via a trigger to the CT. It is not terminated prematurely. To be able to nevertheless ensure a regular change of instructions (which will be needed later for multitasking), the maximum execution time of a CIW has an upper limit. The second property of an instruction is thus required. It is preferably the function of the compiler to ensure that each CIW generated meets this condition. A CIW that violates this condition is an invalid instruction. It may be recognized by the hardware during execution, e.g., via a watchdog timer, which generates a trigger more or less as a warning signal after a certain amount of time has elapsed.

The warning signal is preferably managed as a TRAP by the hardware and/or the operating system. The signal is also preferably sent to the CT. An invalid CIW is preferably terminated via a reconfig trigger, which causes a reset-like deletion of all configurations in the PA and/or an exception is also preferably sent to the operating system.

Since CIWs are very long, the instruction fetch time (time between the reconfiguration trigger of the PAEs to the CT (see PACT08) and configuration is loaded in the FILMO cache) and instruction decode time (distribution of the configuration data from the FILMO cache (see PACT10) into the configuration registers of the PAEs) are also very long. Therefore, utilization of the execution units (i.e., the PA in the VPU processor model) by a process is not very high. How this problem may be solved with multiple processors is described in section 6 below.

3. Subprograms

A subprogram in the graphic representation is a partial graph of a program having uniquely defined input nodes. The edge of the subprogram call within the graph is thus statically known. The continuing edge at the output node of the subprogram, however, is not statically known. This is shown in FIG. 2. The edges of the main program (0201/0202) to the subprogram (0205) are present, but the continuation (0206) after the subprogram is not known to subprogram 0205. The particular continuation is fixedly connected to the subprogram call (indicated by dashed lines and dotted lines). It must be inserted in a suitable manner into the graphs before reaching the input node (0207, 0208). This is illustrated in FIG. 3.

In traditional processors, this is usually accomplished by storing the address of the instruction following the subprogram (this is precisely the missing edge) in a call stack when the subprogram is called (call, 0203, 0204). The address may be called from there by a return.

A stack PAE is thus needed when this principle is applied to the VPU. Like register PAEs, this is a process resource and is managed as such. The CIW, which causes the subprogram call when terminated, configures the return edge on the stack PAE. Through a trigger, the last CIW of the subprogram causes the stack PAE to remove the top entry from the stack and send it as a reconfiguration call to the CT.

In implementing a stack, one of the following methods may be used, for example:

An implementation within the CT. The stack is implemented in the software or as a dedicated hardware unit within the CT. A special config ID (e.g., −1) may be reserved as the return. When the CT receives this ID, it replaces it by the top entry of its locally managed stack.

A stack PAE, which may be designed as a modified RAM PAE according to PACT13 (FIG. 2), for example. Stack overflow and stack underflow are exceptions which are preferably forwarded to the operating system.

4. The Register PAE

A traditional processor register contains a data word at each point in time. An instruction is able to read, write or modify the contents of the register (read-modify-write).

A VPU register will have the same properties, but instead of a single value, according to the present invention it will contain a value vector or parts thereof. It is possible and usually preferable for a VPU register to be organized as a type of FIFO. In certain cases, however, random access may also be necessary. The three types of register access mentioned above are explained in detail below. Random access is not discussed here.

Read access. At the start of a CIW, the register contains a data vector of unknown length. The individual elements of the vector are removed sequentially. With the last element of the vector, a trigger is generated, indicating that the register is now empty and the CIW may terminate. The status of the register may be characterized using three pointers which point to the first entry (0403) in the data vector, the last entry (0401) and the current entry (0402). The position of the pointer at the beginning of a CIW is shown as an example in FIG. 4 (*a*), where the pointer for the current entry points at the first entry.

FIG. 4 (*b*) shows in a first example how the pointer position of a register may appear at the end of a CIW. The vector has not been read completely in the case illustrated here.

Consequently, a decision must be made regarding what happens with the register contents. There are preferably the following options:

The register is emptied. All unprocessed data is deleted. The pointer for the current entry points at the last entry.

The register is reset at the original state. The next CIW may thus again access the full data vector. The pointer for the current entry is reset to point at the first entry.

Only the data already read is removed from the register. The unread data is then available for the next CIW. The pointers are not modified. Subsequently, the values between the first entry and the current entry are removed from the register. They are then no longer available for further operations.

The third option is of interest in particular when a CIW is unable to completely process the data vector because of the maximum execution time for a CIW. See also section 7.

Write access. Data here is written sequentially into the register. A trigger is generated when the filling status of the register has reached a certain level. Depending on the CIW, this may be one of the following preferred possibilities:

The register is completely full.

There are still precisely n entries in the vector that are free. This takes into account the latency time in the CIW through which n values after the trigger are still running to the register.

The register is m % full.

A CIW which attempts to write into a completely full register is invalid and is terminated with an exception (illegal opcode). At the start of the CIW, the status of the register should be determined. FIG. 5 (*a*) shows a register before a write access which still contains data. Existing data may be deleted in such a way that the write access begins with an empty vector (FIG. 5 (*b*)). As an alternative, the write data may also be appended to the existing content. This is shown in FIG. 5 (*c*). This case is of interest when the preceding CIW was unable to generate the complete vector because of the maximum execution time.

FIGS. 5 (*d*) and (*e*) show the state of the register after successful write operations. The newly written data is indicated here with hatching.

Simultaneous read/write access. The restriction to pure read access or write access requires a greater number of registers than necessary. When data is removed from a register by read access, this yields locations which may be occupied by write data. It is only necessary to ensure that write data cannot be read again by the same CIW, i.e., there is a clear separation between the read data of a CIW and the write data of the CIW. For this purpose a virtual dividing line (0601) is introduced into the FIFO. The register has been read completely when this dividing line reaches the output of the FIFO. Suitable means may be implemented for defining this virtual dividing line.

If a write access for a data word is not executable because the register is still blocked by unread read data, the CIW is terminated and an illegal opcode exception is generated. The behavior of the register is otherwise exactly the same as that described for read and write access. In addition, one should specify what is to happen with the virtual dividing line between the read data and write data. This dividing line may remain at the location it is in at the moment. This is beneficial if a CIW must be terminated because of the time restriction. As an alternative, the dividing line may be set at the end of all data.

Combined read/write accesses are problematical, however, if the CIW has been terminated with an exception. In this case, it is no longer readily possible to reset the registers to their values at the start of the CIW. Debugging may then be hindered at the least (see also the following discussion in section 8).

FIG. 6 illustrates the functioning using an example, where the virtual dividing line is labeled 0601. At the beginning, the register contains data (a) which is subsequently read partially (b) or completely (c). Newly written and read entries are indicated here by different types of hatching. FIGS. 6 (*d*) and (*e*) show the state of the register after the required pointer update, which alters the position of the dividing line. This is not an explicit step, but is shown here only for the purpose of illustration. The entries that have been read must be removed immediately to make room for the new entries to be written.

A process, i.e., a program which shares resources with other programs in a multitasking operation in particular, must allocate each required register before it may be used. This is preferably accomplished by an additional configuration register within the RAM PAE and/or the register PAE, an entry also being made indicating to which process the register now belongs. This configuration is retained over reconfigurations. The register must be explicitly enabled by the CT. This happens on termination of a process, for example. With the configuration of each CIW, the registers must be notified of which process the CIW belongs to. This makes it possible to switch between multiple register sets. This process is described in greater detail in section 6 below.

5. Interrupts

A distinction is made between two different types of interrupts. First there are hardware interrupts, where the processor must respond to an external event. These are usually processed by the operating system and are not visible for the ongoing processes. They are not discussed further here. The second type is the software interrupts which are frequently used to implement asynchronous interactions between the process and the operating system. For example, it is possible under VMS to send a read request to the operating system without waiting for the actual data. As soon as the data is present, the operating system interrupts the running program and calls a procedure of the program asynchronously. This method is known as an asynchronous system trap (AST).

This method may also be used in the same way on the VPU. To do so, support may be provided in the CT. The CT knows whether an asynchronous routine must be called up for a process. In this case, the next request coming from the array is not processed directly but instead is stored.

Instead, a sequence of CIWs is inserted, which first saves the processor status (the register contents), which executes the asynchronous routine and which then restores the register content. The original request may be subsequently processed.

6. Multitasking

As described above in section 2, the VPU architecture may, under some circumstances, not be optimally utilized with only one process because very long loading and decoding times occur, e.g., due to the length of the CIWs. This problem may be solved by simultaneous execution of multiple processes. According to the present invention, several register sets are provided on the VPU for this purpose, making it possible to simply switch between register sets when changing context without requiring any complex register clearance and loading operations. This also makes it possible to increase the processing speed.

During execution of CIWs of the processes, enough time is available to retrieve the instructions of the current process and distribute them via the FILMO to the PAEs and/or to load them from the configuration cache into the PAEs (see PACT31). The optimum number of register sets may be determined as a function of the average execution time of a CIW and the average loading and decoding times of the CIWs.

The latency time may be compensated by a larger number of register sets. It is important for the functioning of the method that the average CIW running time is greater than the amount of time effectively needed for loading and/or decoding the CIW in each case.

The corresponding registers of the different register sets are then at the same PAE address for the programmer. In other words, at any point in time, only the registers of one register set may be used. The change in context between the register sets may be implemented by transmitting the corresponding context to the PAEs before each CIW. The context switch may take place automatically as depicted in detail by the PUSH/POP operations according to PACT11 and/or by a special RAM/register PAE hardware, as depicted in PACT13 FIG. 21. Both cases involve a similar stack design in the memory. Each stack entry stores the data of a process. A stack entry includes the complete content of all registers, in other words, all memory cells of all memories which function as registers for a process. Likewise, according to PACT11, a stack entry may also contain PA-internal data and states.

In general, more processes will be present on a system than there are register sets in the processor. This means that a process must occasionally be removed from the processor. To do so, as in the case of the software interrupt, an edge of the program graph is divided by the CT. The register contents of the process are saved and the processor resources i (registers, stack PAEs, etc.) allocated by the process are freed again. The resources thereby freed are then allocated by another process. The register contents stored for this process are then written back again and the process is continued on this divided edge. The register contents may then be saved and reloaded via CIWs.

7. CIW and Loops

On the basis of the property required above, namely that a CIW must terminate after a certain maximum number of cycles at the latest, general loops may not be translated directly into a CIW. It is always possible to translate the loop body into a CIW and to execute the loop control via reconfiguration. However, this often means a considerable sacrifice in terms of performance. This section shows how a loop may be reshaped to minimize the number of reconfigurations.

The following program fragment is assumed below:

```
while (condition) {
  something;
}
``` the running time of "condition" should be determined as "something" or it should be possible to make an upper estimate. The loop may then be reformulated as follows:

```
while (1) {
  if (!condition) goto finish;
  something;
}
finish:
```

The body of the loop may now be iterated as often as allowed by the maximum running time of the CIW. A new variable z is introduced for this purpose; this variable does not occur either in "condition" or in "something." The program now looks as follows:

```
while (1) {
  for (z=0; z<MAX; z++) {
    if (!condition) goto finish;
    something;
  }
}
finish:
```

The "for" loop has a maximum running time which may be determined by the compiler. It may therefore be mapped onto a CIW. MAX is determined by the compiler as a function of the maximum running time and the individual running times of the instructions.

The resulting CIW has two output edges. The output via goto leads to the next CIW; the output via the regular end of "for" forms an edge on itself. The endless loop is implemented via this edge.

8. Debugging

In the traditional processor, debugging is performed on an instruction basis, i.e., the sequence of a program may be interrupted at any time between two instructions. At these interruption points, the programmer has access to the registers, may look at them and modify them. Interruption points may be implemented in various ways. First the program may be modified, i.e., the instruction before which the interruption is to occur, is replaced by other instructions which call the debugger. In the graphic model, this corresponds to replacing one node with another node or with a partial graph. Another method is based on additional hardware support, where the processor is notified of which instruction the program is to be interrupted at. The corresponding instruction is usually identified by its address.

Both possibilities may be applied to the VPU according to the present invention. One CIW may be replaced by another CIW, by action of the debugger, for example. This CIW may then, for example, copy the register contents into the main memory, where they may either be analyzed using a debugger external to the VPU or alternatively the debugger may also run on the VPU.

In addition, hardware support, which identifies CIWs on the basis of their ID when requested and then calls up the debugger, may also be provided in the CT. In addition, an interruption may also be fixedly attached to an edge of the graph because interruptions are present explicitly in contrast with traditional program code.

The type of debugging described above is completely adequate for traditional processors because the instructions are usually very simple. There is a sufficiently fine resolution of the observable points. In addition, the programmer may rely on the individual instructions being correct (usually ensured by the processor manufacturer).

On the VPU, however, it is possible for the programmer to define the CIWs which form a type of "processor instructions." Accordingly, instructions defined in themselves in this way may be defective. Debugging of the individual instructions is thus preferably designed in the manner referred to below as microcode debugging. Microcode debugging is designed in such a way that the programmer gains access to all internal registers and data paths of the processor. It has been recognized that the complexity necessary for this is readily justified by the increased functionality.

Hardware support for this is possible but very complex and is not appropriate for pure debugging purposes. Therefore, as an alternative, the status of the processor before the instruction in question is saved and the actual instruction is executed on a software simulator. This is the preferred method of debugging VPUs according to PACT11. The data and states are preferably transferred to the debugger via a bus interface, memory and/or preferably via a debugging interface such as JTAG. A debugger according to PACT21 is preferably used, preferably containing a mixed-mode debugger having an integrated simulator for processing the micro debugging.

In a suitable programming model, the debugger may also be called when an exception occurs within an instruction. It is appropriate here that the registers may be reset back to the state before the start of the instruction and that no other side effects have occurred. Then the instruction in question may be started in the software simulator and simulated until up to the occurrence of the exception.

Particularly preferred debugging mechanisms are described in detail in PACT21.

Microcode debugging may preferably be implemented by configuring a debugging CIW before or after processing a CIW. This debugging CIW first receives all the states (e.g., in the PAES) and then writes them into an external memory through a suitable configuration of the interconnection resources. The PUSH/POP methods described in PACT11 may be used here particularly preferably. This may preferably take place via an industry standard interface such as JTAG. Then a debugger may receive the data from the memory or via the JTAG interface and, if necessary, simulate it further incrementally in conjunction with a simulator (see PACT21), thus permitting microcode debugging.

9. Distributed Configuration Cache

On the basis of the central configuration cache in FILMO, it takes a relatively long time when using such a cache, which is not obligatory, until a configuration is distributed to the individual PAEs of a PAC. This section will now describe a preferred method for shortening this period of time. A similar alternative or additional method is also already described in PACT31, the full content of which is herewith incorporated for disclosure purposes.

For this purpose, each PAE has its own local cache which stores the configuration data of various configurations for precisely this PAE. The fact that a PAE has not received any data from a configuration is also stored. For each configuration requested, the cache may thus make one of the following statements:

The configuration data is present in the cache.
No data is needed for this configuration.
Nothing is known about this configuration.
Configuration data is needed but it is not available in the cache (e.g., due to the length of the configuration, RAM preload, etc.).

The last two statements may be combined here. With both statements, the code or the fact that no code is needed must be requested. An order for a configuration is sent by the FILMO as a broadcast on the test bus to all PAEs. If all PAEs have the configuration in their local cache, it may be started via broadcast on the config bus. In the ideal case, the start of the configuration thus requires the transmission of only a single configuration word.

If a PAE does not have the configuration data, this fact is reported back to the FILMO. In the simplest case, this is done via a reject on the existing line. The FILMO then knows on the basis of this signal that at least one PAE of the PAC does not have the configuration data. It may then transmit the complete data. As an alternative, each PAE may trigger separately a request for the data. In this case a suitable compromise must be made between the number of requests and the quantity of configuration data to be transmitted. Small PAC sizes are advantageous here because of the lower latency on the configuration bus.

Design of the Cache

A cache is generally always composed of two parts. One part contains the actual data (here the configuration words, 0902) while the other part contains management information (here the configuration numbers contained as well as their age, 0901).

First the management part is described.

Figure 8:
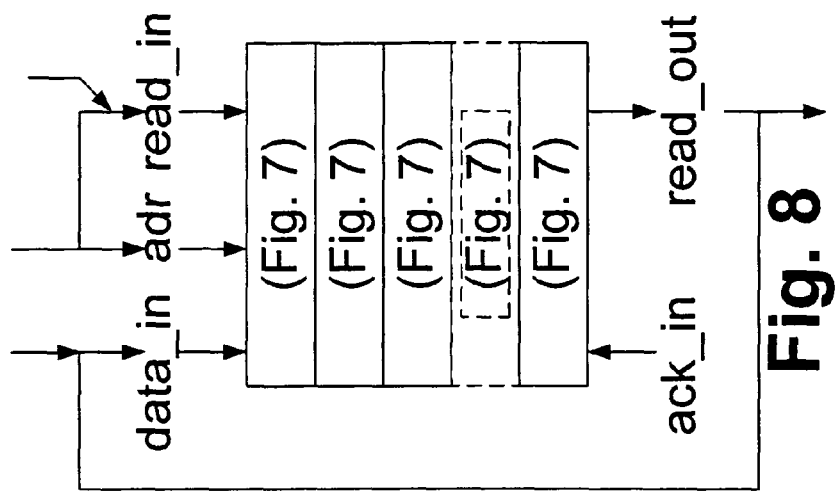
FIG. 8 shows the connection of multiple stages
Figure 7:
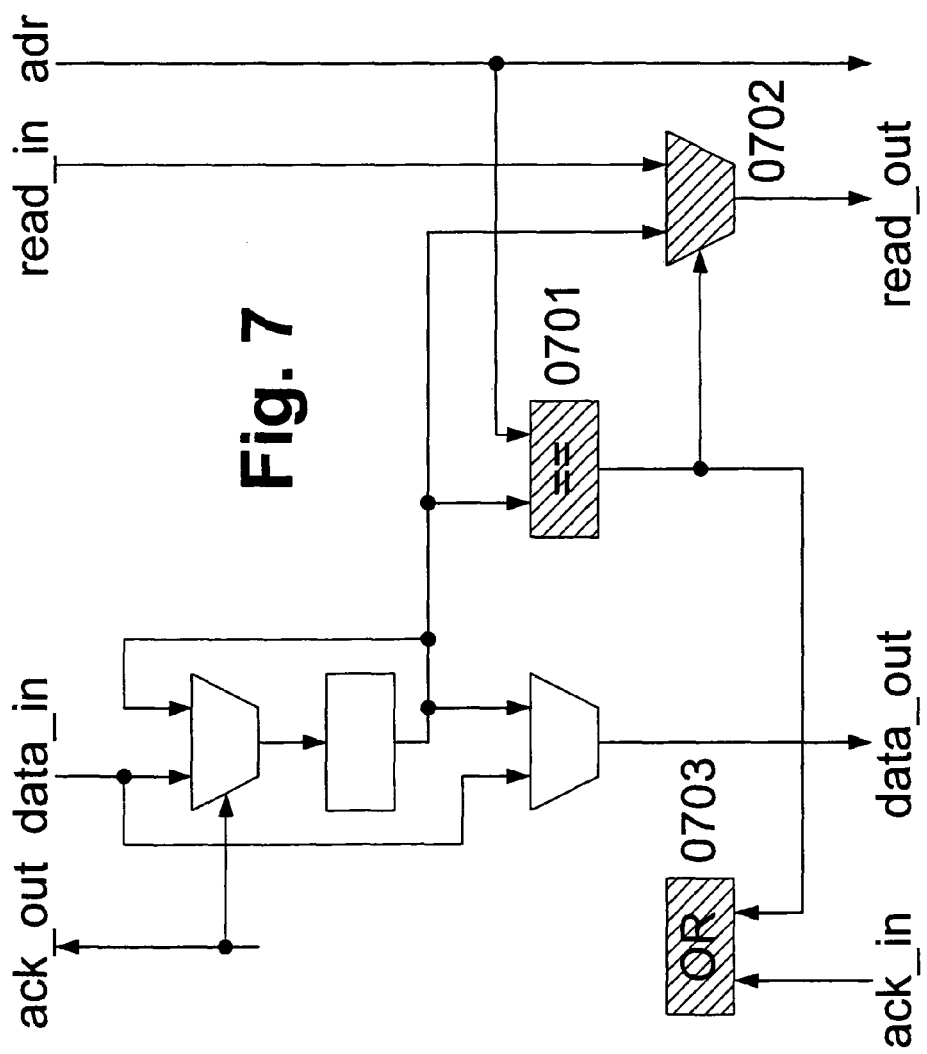
FIG. 7 shows an example of a FIFO stage.

It is desirable for the configuration which has not been used for the longest period of time to be removed from the cache if this is necessary. As long as only new configurations are requested, the entries in the FIFO are sorted correctly. If a configuration is requested for which there is already an entry in the FIFO, this entry must be removed from the FIFO. It is then reinserted again at the end. FIG. 7 shows an example of a FIFO stage modified for this purpose. The modules shown with hatching are in addition to a normal FIFO stage according to the related art. They compare via the comparator (0701) the configuration number of the data content of the stage with the requested configuration number and, if they are the same, generate an ack (0702) for that stage. Thus, the data of the stage is read via the multiplexer (0703) and all the other values move up by one stage. The entries in this FIFO also contain additional information in addition to the configuration number. This is either a pointer (address) to the configuration data or one of the two possibilities "no data necessary" (e.g., coded as 0) or "data must be requested," (e.g., −1). FIG. 8 shows the connection of multiple stages, where the read chain is initialized with the required configuration number and the status −1. This value then comes out unchanged at the output of the read chain exactly when the configuration number is not stored in the FIFO. The output of the read chain may thus be used in any case to write the configuration number into the FIFO. Signal ack_in is activated when the FIFO is full and the desired configuration number is not in the FIFO. This is the only case when the oldest entry must be removed from the FIFO because the management memory is full. The actual data memory is organized as a chained list because of the different number of configuration words per configuration. Other implementations are also conceivable. A chained list may then be implemented easily as a RAM by storing the address of the following data word in addition to the data.

In addition to the lists for the actual configurations, a free list is carried, listing all the entries which are not being used. This must be initialized first after a reset.

Figure 9:
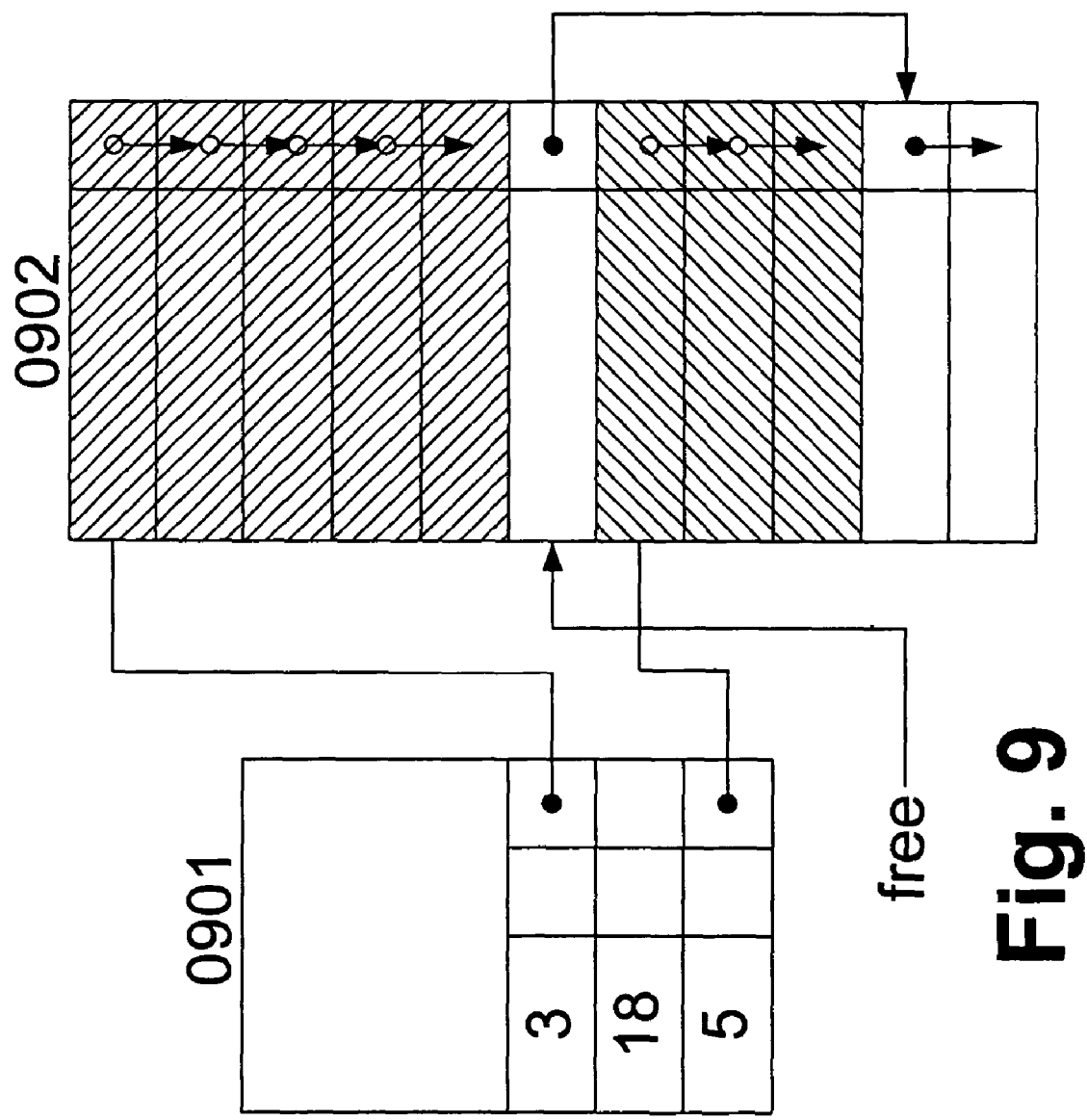
FIG. 9 shows a possible cache content during operation.

FIG. 9 shows a possible cache content during operation. Free entries in the data memory are white, while entries occupied by a configuration are shown with hatching. Configurations need not be located at successive addresses. Configuration 18 has no configuration data and therefore does not also have a pointer in the data memory.

A new configuration is written into the free list in the data memory. In doing so the pointer information of the data memory is not modified. Only for the last data word of a configuration is the pointer information altered to indicate that the list is now being modified here. The pointer to the free list points at the next entry.

It may happen that the space in the free list is not sufficient to completely accommodate the incoming configuration data. In this case, a decision must be made as to whether an old configuration is to be removed from the data memory or whether the current configuration is not to be included in the cache. In the latter case, the subsequent configuration words are discarded. Since no pointer has been modified, the free list remains the same as before and only a few unused data words have a different value. The decision as to which configuration should no longer be in the cache (the oldest or the current) may be made on the basis of the number of configuration words already written. There is little point in removing several cached configurations to make room for a long RAM initialization, for example.

If the oldest configuration is to be removed, it is removed from the FIFO. The pointer for the last entry in the free list is set at the value taken from the FIFO. After this address, configuration may be continued in the accustomed manner.

Figure 10B:
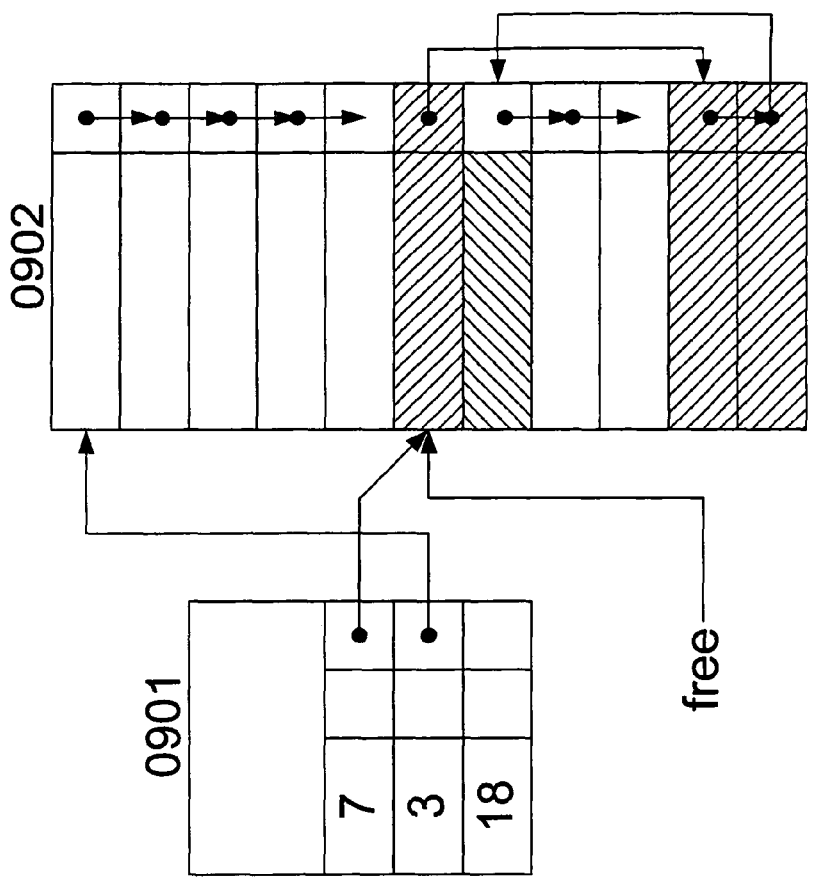
FIG. 10b shows memory parts affected.
Figure 10A:
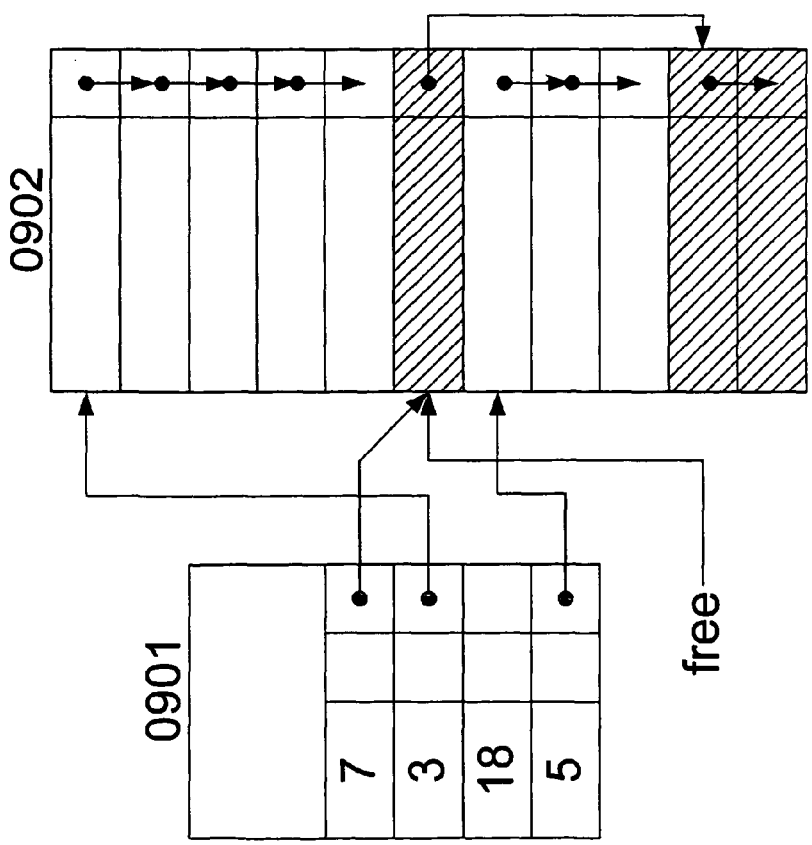
FIG. 10a shows the free list as completely full.

FIG. 10 shows an example of this. Configuration no. 7 is to be reconfigured. FIG. 10 (a) shows the free list as completely full. A decision is made to remove the oldest configuration (no. 5) from the cache and to write configuration no. 7 into the cache. To do so, the pointer is moved from the end of the free list to the start of former configuration 5. The free list is thus lengthened again and space is again available for new configuration words. The memory parts affected in this step are shown with contradiagonal hatching in FIG. 10 (b). With a suitable division of the memory, this may take place in one cycle. With the last configuration word, the corresponding pointer points at the end and the free pointer points at the next entry. Space in the data memory is then not only freed up again when needed by the inclusion of a new configuration, but also if the management memory is full and therefore an entry is removed from the management memory, the free list in the data memory must be adapted. To do so, either the pointer at the end of the free list or at the end of the configuration being freed up is adapted. Both types of information are not yet available at this point. It is now possible to move through one of the lists until reaching the end. However, this is time-consuming. As an alternative, an additional pointer to the particular end of a configuration is stored in the management memory. Modification is then easily possible. The free pointer receives the starting address of the old configuration, and the pointer at the last configuration word in the data memory points at the free pointer.

Figure 11B:
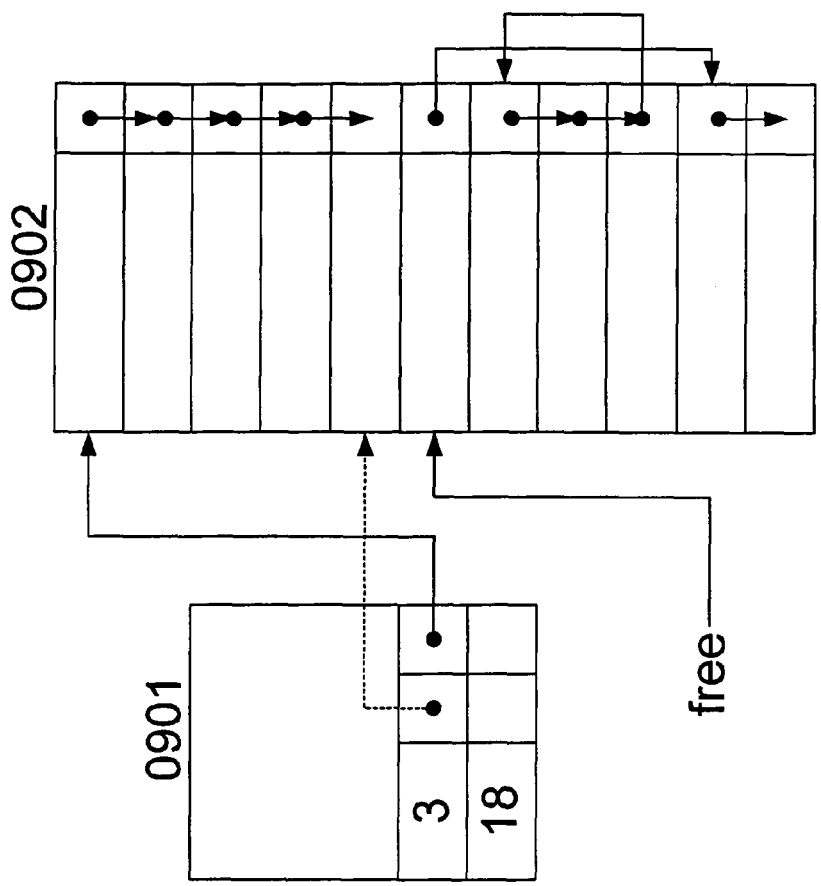
FIG. 11b shows a state after deletion.
Figure 11A:
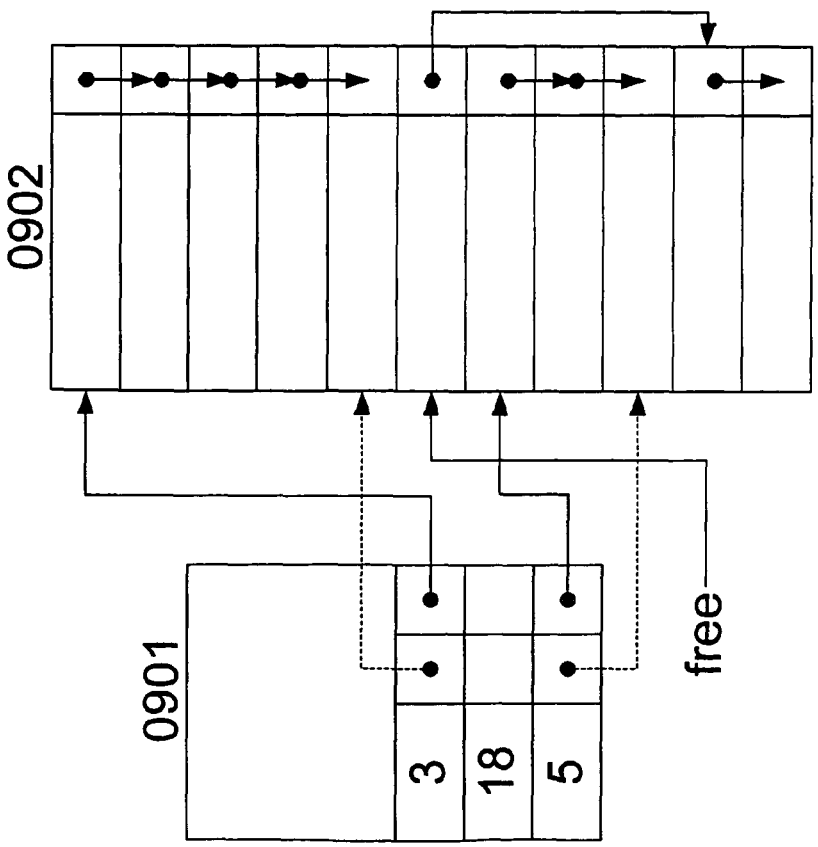
FIG. 11a shows a state prior to deletion.

This is illustrated in FIG. 11. The pointers to the configuration ends are shown with dashed lines. FIG. 11 (a) illustrates the situation before deletion, FIG. 11 (b) illustrates the situation afterwards.

10. Optimization of Bus Allocation

The buses are currently defined explicitly by the router. This may result in two configurations overlapping on a bus and therefore not being able to run simultaneously although on the whole enough buses would be available.

It has been recognized that it does not matter in terms of the algorithm which bus carries a connection. Therefore, it is proposed that bus allocation be performed dynamically by the hardware and the hardware be provided with a suitable dynamic bus allocator. A configuration specifies only that it needs a connection from point A to point B within a row. An arbiter in the hardware which is able to work per row either via proximity relationships in a distributed manner or at a central location for the row then selects which of the available buses is in fact used. In addition, buses may be dynamically rearranged. Two short non-overlapping buses which have been configured to different bus numbers on the basis of a previous allocation may be rearranged to the same bus number when resources become available. This creates space for longer connections in the future.

What is claimed is:

1. A method of data processing using a processor comprising a reconfigurable field of data processing cells, the method comprising:
   configuring, by the processor, a first subset of the data processing cells, such that the first subset of the data processing cells has a first configuration while one or more other subsets of the data processing cells has, respectively, one or more other configurations;
   processing data, by the first subset of the data processing cells, while the first subset of the data processing cells is configured with the first configuration;
   monitoring, by the processor, whether a maximum allowed execution runtime of the first configuration is exceeded; and
   responsive to determining, in the monitoring step, that the maximum allowed execution runtime of the first configuration is exceeded, removing, by the processor, the first configuration and the one or more other configurations.

2. The method of claim 1, where the maximum allowed execution runtime of the first configuration is determined by the processor to be exceeded conditional upon a lapse of the maximum allowed execution runtime without the first subset of the data processing cells requesting a new configuration.

3. The method of claim 1, wherein the first subset of the data processing cells is adapted to, while the first subset of the data processing cells is configured with the first configuration, request a new configuration of one or more of the first subset of the data processing cells.

4. A method of data processing using a processor comprising a reconfigurable field of data processing cells and a memory arrangement, wherein the memory arrangement stores therein a data vector, the method comprising:
   sequentially reading, by the field using a first configuration of the field, a first subset of data elements of the data vector;
   monitoring whether a maximum allowed execution runtime of the first configuration is exceeded;

responsive to determining in the monitoring step that the maximum allowed execution runtime is exceeded, removing the first configuration and configuring the field with a second configuration prior to readout of all of the data elements of the data vector, such that a second subset of the data elements of the data vector remains unread in the memory arrangement; and subsequent to the removing of the first configuration and the configuring of the field with the second configuration, sequentially reading, by the field using the second configuration, one or more data elements of the second subset of the data elements.

5. The method of claim 4, further comprising:

for each of the sequentially read data elements, updating a pointer to point to a different memory location of the memory arrangement than prior to the updating, wherein a beginning of the sequential reading of the one or more data elements of the second subset of the data element is performed based on a position into which the pointer entered while the field was configured with the first configuration.

* * * * *